US012248100B2

(12) United States Patent
Shand

(10) Patent No.: US 12,248,100 B2
(45) Date of Patent: *Mar. 11, 2025

(54) USE OF EXTENDED DETECTION PERIODS FOR RANGE ALIASING DETECTION AND MITIGATION IN A LIGHT DETECTION AND RANGING (LIDAR) SYSTEM

(71) Applicant: Waymo LLC, Mountain View, CA (US)

(72) Inventor: Mark Alexander Shand, Palo Alto, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/412,820

(22) Filed: Jan. 15, 2024

(65) Prior Publication Data
US 2024/0151829 A1 May 9, 2024

Related U.S. Application Data

(63) Continuation of application No. 17/839,676, filed on Jun. 14, 2022, now Pat. No. 11,927,697, which is a
(Continued)

(51) Int. Cl.
G01S 7/4865 (2020.01)
G01S 17/10 (2020.01)
(Continued)

(52) U.S. Cl.
CPC ............ G01S 7/4865 (2013.01); G01S 17/10 (2013.01); G01S 17/42 (2013.01); G01S 17/931 (2020.01)

(58) Field of Classification Search
CPC ........ G01S 7/4865; G01S 17/10; G01S 17/42; G01S 17/931; G01S 7/484; G01S 7/491;
(Continued)

(56) References Cited

U.S. PATENT DOCUMENTS 7,746,449 B2 6/2010 Ray et al.
8,368,876 B1 2/2013 Johnson et al.
(Continued)

FOREIGN PATENT DOCUMENTS

CN 101449181 A 6/2009
CN 103954971 A 7/2014
(Continued)

OTHER PUBLICATIONS

Definition of Range ambiguity resolution from Wikipedia, retrieved on Jun. 29, 2017, https://en.wikipedia.org/wiki/Range_ambiguity_resolution (4 pages).
(Continued)

Primary Examiner — Daniel L Murphy
(74) Attorney, Agent, or Firm — MCDONNELL BOEHNEN HULBERT & BERGHOFF LLP

(57) ABSTRACT

A computing system may operate a LIDAR device to emit and detect light pulses in accordance with a time sequence including standard detection period(s) that establish a nominal detection range for the LIDAR device and extended detection period(s) having durations longer than those of the standard detection period(s). The system may then make a determination that the LIDAR detected return light pulse(s) during extended detection period(s) that correspond to particular emitted light pulse(s). Responsively, the computing system may determine that the detected return light pulse(s) have detection times relative to corresponding emission times of particular emitted light pulse(s) that are indicative of one or more ranges. Given this, the computing system may make a further determination of whether or not the one or more ranges indicate that an object is positioned outside of the nominal detection range, and may then engage in object detection in accordance with the further determination.

20 Claims, 18 Drawing Sheets

Related U.S. Application Data continuation of application No. 16/851,987, filed on Apr. 17, 2020, now Pat. No. 11,415,680, which is a continuation of application No. 15/665,591, filed on Aug. 1, 2017, now Pat. No. 10,627,492.

(51) Int. Cl.
  *G01S 17/42* (2006.01)
  *G01S 17/931* (2020.01)

(58) Field of Classification Search
  CPC ..... G01S 17/89; G01S 7/4913; G05D 1/0214; G05D 1/0257
  USPC ........................................................ 356/5.01
  See application file for complete search history.

(56) References Cited

U.S. PATENT DOCUMENTS

| | | | |
|---|---|---|---|
| 8,629,976 | B2 | 1/2014 | Hui et al. |
| 9,097,800 | B1 | 8/2015 | Zhu |
| 9,207,680 | B1 | 12/2015 | Agarwal et al. |
| 9,383,447 | B2 | 7/2016 | Schmitt et al. |
| 9,383,753 | B1 | 7/2016 | Templeton et al. |
| 10,627,492 | B2 | 4/2020 | Shand |
| 11,415,680 | B2 | 8/2022 | Shand |
| 11,927,697 | B2 | 3/2024 | Shand |
| 2005/0162638 | A1 | 7/2005 | Suzuki et al. |
| 2009/0185159 | A1 | 7/2009 | Rohner et al. |
| 2012/0123718 | A1 | 5/2012 | Ko et al. |
| 2013/0062522 | A1 | 3/2013 | Jiang et al. |
| 2014/0168369 | A1 | 6/2014 | Crane et al. |
| 2015/0070683 | A1 | 3/2015 | Lepere et al. |
| 2015/0331113 | A1 | 11/2015 | Stettner et al. |
| 2015/0369919 | A1 | 12/2015 | Pollmer |
| 2016/0259039 | A1 | 9/2016 | Ohtomo et al. |
| 2016/0266242 | A1 | 9/2016 | Gilliland et al. |
| 2016/0274231 | A1 | 9/2016 | Lee et al. |
| 2016/0274237 | A1 | 9/2016 | Stutz |
| 2016/0274589 | A1 | 9/2016 | Templeton et al. |
| 2016/0291135 | A1 | 10/2016 | Ando et al. |
| 2016/0291138 | A1 | 10/2016 | Drader et al. |
| 2016/0320487 | A1 | 11/2016 | Wong |
| 2016/0341848 | A1 | 11/2016 | Nakamura |
| 2016/0370460 | A1 | 12/2016 | Takahashi et al. |
| 2017/0269197 | A1 | 9/2017 | Hall et al. |
| 2018/0149750 | A1 | 5/2018 | Kishimoto et al. |
| 2019/0004149 | A1 | 1/2019 | Mano et al. |

FOREIGN PATENT DOCUMENTS

| | | |
|---|---|---|
| CN | 105814452 A | 7/2016 |
| CN | 105917284 A | 8/2016 |
| CN | 105938197 A | 9/2016 |
| CN | 105988119 A | 10/2016 |
| EP | 3159711 A1 | 4/2017 |
| JP | S61-149879 A | 7/1986 |
| JP | H06-034320 A | 2/1994 |
| JP | H07-229965 A | 8/1995 |
| JP | 2005-091174 A | 4/2005 |
| JP | 2007-322331 A | 12/2007 |
| JP | 2010-81244 A | 4/2010 |
| JP | 2012-215521 A | 11/2012 |
| JP | 2013-076645 A | 4/2013 |
| WO | 9600909 A1 | 1/1996 |
| WO | 2017022152 A1 | 2/2017 |
| WO | 2017110413 A1 | 6/2017 |

OTHER PUBLICATIONS

International Search Report and Written Opinion for PCT application No. PCT/US2018/036275, dated Oct. 2, 2018.
Written Opinion and International Search Report for corresponding PCT application No. PCT/US2018/036227, dated Sep. 21, 2018.

USE OF EXTENDED DETECTION PERIODS FOR RANGE ALIASING DETECTION AND MITIGATION IN A LIGHT DETECTION AND RANGING (LIDAR) SYSTEM

CROSS-REFERENCE TO RELATED APPLICATIONS

This application is a continuation of U.S. patent application Ser. No. 17/839,676, filed Jun. 14, 2022, which is a continuation of U.S. patent application Ser. No. 16/851,987, filed on Apr. 17, 2020, which is a continuation of U.S. patent application Ser. No. 15/665,591, filed on Aug. 1, 2017, which applications are incorporated herein by reference. U.S. patent application Ser. No. 15/638,607, filed on Jun. 30, 2017, is also incorporated herein by reference.

BACKGROUND

A vehicle can be configured to operate in an autonomous mode in which the vehicle navigates through an environment with little or no input from a driver. Such an autonomous vehicle can include one or more sensors that are configured to detect information about the environment in which the vehicle operates. One such sensor is a light detection and ranging (LIDAR) device.

A LIDAR device can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse.

A LIDAR device may thus include a laser, or set of lasers, and may rapidly and repeatedly scan across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

One challenge in using LIDARs can be range aliasing. Range aliasing relates to the appearance of false echoes, such as when a system cannot disambiguate between a signal scattered from one particular range and a signal scattered from other ranges based on the generated data. For example, in the context of LIDARs, range aliasing can refer a return signal from outside a LIDAR's maximum unambiguous range being interpreted to be within the LIDAR's maximum unambiguous range.

SUMMARY

Example implementations may relate to methods and system for using extended detection periods to determine whether or not an object is positioned outside of a nominal detection range of a LIDAR device.

In particular, a computing system may operate a LIDAR device to emit and detect light pulses in accordance with a time sequence including standard detection period(s) that establish the nominal detection range for the LIDAR device and including extended detection period(s) having durations longer than those of the standard detection period(s). In this way, the computing system may extend the detection range of the LIDAR device during the extended detection periods.

With this arrangement, based on detection of light pulse (s) by the LIDAR device during these extended detection periods, the computing system could determine whether or not the LIDAR device detected return light pulses that reflected off an object positioned outside of the nominal detection range of the LIDAR device. Specifically, the computing system may determine, respectively for each such detected light pulse, a range according to a time delay relative to an emission time of a most recently emitted light pulse. If the computing system then determines that the nominal detection range comprises these determined ranges, then the computing system may responsively make a determination that these ranges do not indicate that an object is positioned outside of the nominal detection range. Whereas, if the computing system determines that the nominal detection range does not comprise these determined ranges, then the computing system may responsively make a determination that these ranges indicate that an object is positioned outside of the nominal detection range.

Once the computing system makes the determination of whether or not the ranges indicate that an object is positioned outside of the nominal detection range, the computing system may then engage in object detection accordingly. For example, if the computing system determines that the ranges indicate an object is positioned outside of the nominal detection range, the computing system could then carry out operations to identify that object and/or to determine a distance to that object. In another example, the computing system could use the determination as a basis for overcoming range ambiguity in other detection periods, such as by using the determination as a basis for determining whether or not light pulses detected in other detection periods reflected off object(s) positioned outside the nominal detection range. In yet another example, the computing system could use the determination as a basis for selectively triggering use of other processes that help overcome range ambiguity. Other examples are also possible.

In one aspect, a method is disclosed. The method involves operating, by a computing system, a Light Detection and Ranging (LIDAR) device to emit light pulses at emission times in accordance with an emission time sequence and to detect return light pulses in accordance with a detection time sequence, where the detection time sequence includes, for each emitted light pulse, a corresponding detection period for detection of a corresponding return light pulse, and where the corresponding detection periods comprise (i) one or more standard detection periods that establish a nominal detection range for the LIDAR device and (ii) one or more extended detection periods having respective durations that are longer than respective durations of the one or more standard detection periods. The method also involves making a determination, by the computing system, that the LIDAR device detected one or more return light pulses during one or more of the extended detection periods that correspond to one or more particular emitted light pulses. The method additionally involves, in response to making the determination, determining, by the computing system, that the one or more detected return light pulses have detection times relative to corresponding emission times of the one or more particular emitted light pulses that are indicative of one or more ranges. The method further involves making a further determination, by the computing system, of whether or not the one or more ranges indicate that an object is positioned outside of the nominal detection range. The method yet further involves engaging, by the computing system, in object detection in accordance with the further determination.

In another aspect, a computing system for a self-driving vehicle is disclosed. The computing system includes one or more processors, a non-transitory computer readable medium, and program instructions stored on the non-transitory computer readable medium and executable by the one or more processors. In particular, the program instructions may be executable to operate a Light Detection and Ranging (LIDAR) device to emit light pulses at emission times in accordance with an emission time sequence, where the emission time sequence includes a standard time period after a majority of emissions in the sequence and an extended time period after at least one of the emissions in the sequence, wherein the standard time period is associated with a nominal detection range for the LIDAR device.

In yet another aspect, a vehicle is disclosed. The vehicle includes a Light Detection and Ranging (LIDAR) device and a computing system. The computing system may be configured to operate the LIDAR device to emit light pulses at emission times in accordance with an emission time sequence and to detect return light pulses in accordance with a detection time sequence, where the detection time sequence includes, for each emitted light pulse, a corresponding detection period for detection of a corresponding return light pulse, and where the corresponding detection periods comprise (i) one or more standard detection periods that establish a nominal detection range for the LIDAR device and (ii) one or more extended detection periods having respective durations that are longer than respective durations of the one or more standard detection periods. The computing system may also be configured to make a determination that the LIDAR device detected one or more return light pulses during one or more of the extended detection periods that correspond to one or more particular emitted light pulses. The computing system may additionally be configured to, in response to making the determination, determine that the one or more detected return light pulses have detection times relative to corresponding emission times of the one or more particular emitted light pulses that are indicative of one or more ranges. The computing system may be further configured to make a further determination of whether or not the one or more ranges indicate that an object is positioned outside of the nominal detection range. The computing system may be yet further configured to engage in object detection in accordance with the further determination.

In yet another aspect, another system is disclosed. The system may include means for operating a Light Detection and Ranging (LIDAR) device to emit light pulses at emission times in accordance with an emission time sequence and to detect return light pulses in accordance with a detection time sequence, where the detection time sequence includes, for each emitted light pulse, a corresponding detection period for detection of a corresponding return light pulse, and where the corresponding detection periods comprise (i) one or more standard detection periods that establish a nominal detection range for the LIDAR device and (ii) one or more extended detection periods having respective durations that are longer than respective durations of the one or more standard detection periods. The system may also include means for making a determination that the LIDAR device detected one or more return light pulses during one or more of the extended detection periods that correspond to one or more particular emitted light pulses. The system may additionally include means for, in response to making the determination, determining that the one or more detected return light pulses have detection times relative to corresponding emission times of the one or more particular emitted light pulses that are indicative of one or more ranges. The system may further include means for making a further determination of whether or not the one or more ranges indicate that an object is positioned outside of the nominal detection range. The system may yet further include means for engaging in object detection in accordance with the further determination.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
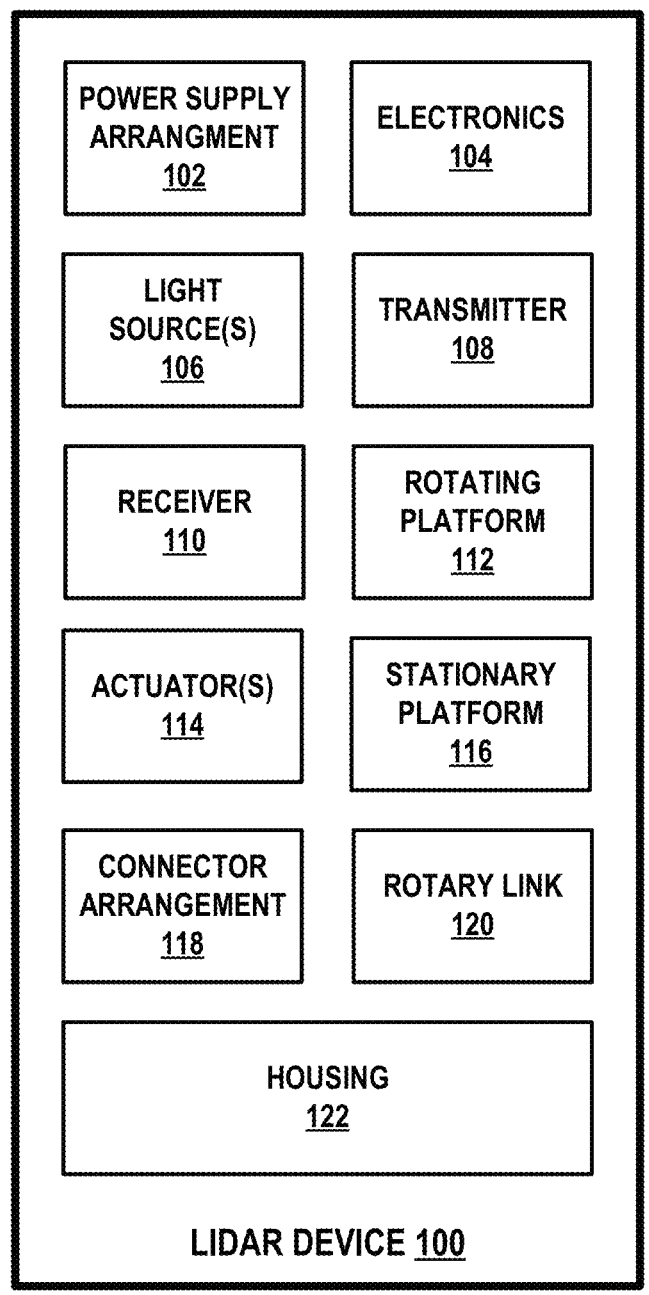
FIG. 1 is a simplified block diagram of a LIDAR device, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

There are continued efforts to improve autonomous operation in which a vehicle navigates through an environment with little or no input from a driver. Such efforts include development of vehicles equipped with remote sensing capabilities and possibly accident-avoidance systems. For instance, various sensors, such as a LIDAR device, may be included in a vehicle to detect objects in an environment of the vehicle and to thereby facilitate autonomous operation and/or accident avoidance.

Generally, a LIDAR device can help estimate distance(s) to environmental features while scanning through a scene to assemble a "point cloud" indicative of reflective surfaces in the environment. Individual points in the point cloud can be determined by emitting a light pulse and detecting a returning light pulse, if any, reflected from an object in the environment, and determining the distance to the object according to the time delay between the emitted light pulse and the detection of the reflected returning light pulse. A LIDAR can include laser(s) or other light sources. The laser(s), or the LIDAR as a whole, can rapidly and repeatedly scan across a scene to provide continuous real-time information on distances to reflective objects in the scene. With this arrangement, combining the measured distances and the orientation of the laser(s) while measuring each distance allows for associating a three-dimensional position with each returning light pulse. In this way, a three-dimensional map of points indicative of locations of reflective features in the environment can be generated for the entire scanning zone.

When a computing system (e.g., in a vehicle) operates a LIDAR device, the computing system may operate the LIDAR device to emit and detect light pulses in accordance with certain timing. For example, the computing system may operate the LIDAR device to emit light pulses at emission times in accordance with an emission time sequence, such as a periodic sequence (e.g., emission of a light pulse once every microsecond). In this example, the computing system may also operate the LIDAR device to detect return light pulses in accordance with a detection time sequence. The detection time sequence may have a detection period intended to detect a light pulse returned from an object located within a certain range of the LIDAR. This detection period could be referred to herein as a nominal detection period or a standard detection period, and this range could be referred to herein as a nominal unambiguous detection range or a nominal detection range.

More specifically, a corresponding detection period for a given light pulse may begin immediately following or at some time after emission of that given light pulse, and may end before or after emission of a subsequent light pulse. This corresponding detection period could be arranged for detection of a return light pulse that corresponds to the given emitted light pulse reflecting off an object located within the nominal detection range of the LIDAR to result in that corresponding return light pulse. In practice, the nominal detection range spans a minimum distance, $x_0$, to a maximum distance $x_m$, from the LIDAR device. The minimum distance, $x_0$, may be 0 meters and maximum distance $x_m$, may be 60 meters, for example. In other instances, the minimum distance, $x_0$, may be a distance >0 m away from the LIDAR where object detection is unlikely or would not be an input in the maneuvering of the vehicle, for example. For instance, if the LIDAR is mounted beneath an aircraft, $x_0$ may be 2 meters. Other distances are also contemplated. Moreover, the minimum distance could be referred to herein as a minimum unambiguous detection range, and the maximum distance could be referred to herein as a maximum unambiguous detection range.

When the LIDAR device detects return light pulses, the computing system could generate a range hypothesis for these detected return light pulses. Specifically, the computing system could determine, respectively for each detected light pulse, a range according to a time delay relative to an emission time of a most recently emitted light pulse. This range hypothesis may be referred to herein as the close range hypothesis or the default range hypothesis.

Generally, a light pulse that is reflected off an object positioned outside of the nominal detection range would not be detected by the LIDAR device within the nominal detection period. For instance, the LIDAR device may not detect such a light pulse if the light pulse's intensity is significantly attenuated before arriving at the LIDAR device.

In some situations, however, the LIDAR device may nonetheless detect a light pulse that is reflected off an object positioned outside of the nominal detection range. For example, the object at issue may be a retroreflective object (e.g., a large freeway road sign) positioned beyond the nominal detection range's maximum distance. When a light pulse reflects off a retroreflective object located beyond the nominal detection range, the return light pulse may be detected by the LIDAR device during a detection period after the nominal detection period, giving rise to range ambiguity. In another example, the object at issue may be an object positioned closer to the LIDAR device than the nominal detection range's minimal distance. Consequently, in some scenarios, when a light pulse reflects off that closer object, the LIDAR device may detect that light pulse during a detection period before the nominal detection period, also giving rise to range ambiguity.

Disclosed herein is an approach that can help a computing system determine whether or not a LIDAR device detected return light pulses that reflected off an object positioned outside the nominal detection range. In accordance with the disclosed approach, the computing system could be arranged to extend respective durations of one or more detection periods. Given this, the computing system may in turn extend the detection range of the LIDAR device during these extended detection periods. As such, based on detection of light pulse(s) by the LIDAR device during these extended detection periods, the computing system could determine whether or not the LIDAR device detected return light pulses that reflected off an object positioned outside of the nominal detection range of the LIDAR device.

In particular, the computing system may operate the LIDAR device to have one or more standard detection periods and one or more extended detection periods. The standard detection period may be those that establish the nominal detection range for the LIDAR device, in line with the discussion above. The extended detection periods may have respective durations that are longer than respective durations of the standard detection periods, thereby temporarily expanding the detection range of the LIDAR device during those extended detection periods.

In an example implementation, the extended detection periods could be arranged to occur at any feasible time. By way of example, the extended detection periods could take place in accordance with a fixed schedule, such as by taking place periodically or non-periodically. For instance, one in every 64 detection periods could be extended, and the remaining detection periods could be standard detection periods. In other examples, however, the extended detection periods may not take place in accordance with a fixed schedule. For instance, the computing system could selectively extend one or more detection periods based on one or more factors. Other examples are also possible.

With this arrangement, when the LIDAR device detects return light pulse(s) during extended detection period(s) associated with particular emitted light pulse(s), the computing system could then responsively determine ranges associated with these detections and use these ranges as basis for determining whether or not the LIDAR device detected light pulses that reflected off an object positioned outside of the nominal detection range.

More specifically, the computing system could determine that the detected return light pulses have detection times relative to corresponding emission times of the particular emitted light pulses that are indicative of one or more ranges. Based on a comparison of these determined ranges to the nominal detection range, the computing system could then make a determination of whether or not these ranges indicate that an object is positioned outside of the nominal detection range of the LIDAR device.

By way of example, the computing system may determine whether or not the determined ranges are greater than the above-mentioned maximum unambiguous detection range of the LIDAR device. If the computing system determines that the determined ranges are not greater than the maximum unambiguous detection range, then the computing system may responsively determine that the detected light pulses reflected off an object positioned within the nominal detection range, and thus that the ranges do not indicate that an object is positioned outside of the nominal detection range (e.g., assuming a minimum unambiguous detection range of 0 m). However, if the computing system determines that the determined ranges are greater than the maximum unambiguous detection range, then the computing system may responsively determine that the detected light pulses reflected off an object positioned beyond the maximum unambiguous detection range, and thus that the ranges indicate that an object is positioned outside of the nominal detection range. Other examples are also possible.

Once the computing system evaluates light pulse(s) detected during the extended detection period(s) and makes a determination of whether or not the ranges indicate that an object is positioned outside of the nominal detection range, the computing system may then engage in object detection accordingly. For example, if the computing system determines that the ranges indicate an object that is positioned beyond the maximum detection range, the computing system could use one or more techniques to identify the object and/or to determine a distance to that object, among other options. In another example, the computing system could use the determination as a basis for overcoming range ambiguity in other detection periods. For example, the computing system could use the determination as basis for determining whether or not light pulses detected in other detection periods reflected off object(s) positioned outside the nominal detection range. In any case, such detection of object(s) could in turn help the computing system optimize autonomous operation of a vehicle, among other outcomes.

In this manner, the disclosed approach could help reduce the extent of computation often carried out to determine whether or not an object is positioned outside of a nominal detection range of a LIDAR device. For instance, if a LIDAR device is operated to only have standard detection periods, then range ambiguity may arise if during such standard detection periods the LIDAR device detects return light pulses that reflected off an object positioned outside of the nominal detection range. And although certain processes could help overcome range ambiguity and/or help detect objects positioned outside of the nominal detection range, such processes could be computationally costly. Therefore, given that the disclosed approach could help overcome these issues by sparsely extending respective durations of detection period(s), the disclosed approach could help avoid use of such processes and/or could serve as a guide for selectively triggering use of such processes, and thus could ultimately help reduce the extent of computational resources being used by a computing system.

II. EXAMPLE ARRANGEMENT OF A LIDAR DEVICE

Referring now to the Figures, FIG. 1 is a simplified block diagram of a LIDAR device 100, according to an example embodiment. As shown, the LIDAR device 100 includes a power supply arrangement 102, electronics 104, light source(s) 106, at least one transmitter 108, at least one receiver 110, a rotating platform 112, actuator(s) 114, a stationary platform 116, a connector arrangement 118, a rotary link 120, and a housing 122. In other embodiments, the LIDAR device 100 may include more, fewer, or different components. Additionally, the components shown may be combined or divided in any number of ways.

Power supply arrangement 102 may be configured to supply power to various components of the LIDAR device 100. In particular, the power supply arrangement 102 may include or otherwise take the form of at least one power source disposed within the LIDAR device 100 and connected to various components of the LIDAR device 100 in any feasible manner, so as to supply power to those components. Additionally or alternatively, the power supply arrangement 102 may include or otherwise take the form of a power adapter or the like that is configured to receive power from one or more external power sources (e.g., from a power source arranged in a vehicle to which the LIDAR device 100 is coupled) and to supply that received power to various components of the LIDAR device 100 in any feasible manner. In either case, any type of power source may be used such as, for example, a battery.

Electronics 104 may include one or more electronic components and/or systems each arranged to help facilitate certain respective operations of the LIDAR device 100. In practice, these electronics 104 may be disposed within the LIDAR device 100 in any feasible manner. For instance, at least some of the electronics 104 may be disposed within a central cavity region of the rotary link 120. Nonetheless, the electronics 104 may include various types of electronic components and/or systems.

For example, the electronics 104 may include various wirings used for transfer of control signals from a computing system to various components of the LIDAR device 100 and/or for transfer of data from various components of the LIDAR device 100 to the computing system. Generally, the data that the computing system receives may include sensor data based on detections of light by the receiver 110, among other possibilities. Moreover, the control signals sent by the computing system may operate various components of the LIDAR device 100, such as by controlling emission of light by the transmitter 106, controlling detection of light by the receiver 110, and/or controlling the actuator(s) 114 to rotate the rotating platform 112, among other possibilities.

In some arrangements, the electronics 104 may also include a computing system. This computing system may have one or more processors, data storage, and program instructions stored on the data storage and executable by the one or more processor to facilitate various operations. With this arrangement, the computing system may thus be configured to carry out operations described herein, such as those of methods described below. Additionally or alternatively, the computing system may communicate with an external computing system, control system, or the like (e.g., a computing system arranged in a vehicle to which the LIDAR device 100 is coupled) so as to help facilitate transfer of control signals and/or data between the external system and various components of the LIDAR device 100.

In other arrangements, however, the electronics 104 may not include a computing system. Rather, at least some of the above-mentioned wirings may be used for connectivity to an external computing system. With this arrangement, the wirings may help facilitate transfer of control signals and/or data between the external computing system and the various components of the LIDAR device 100. Other arrangements are possible as well.

Further, one or more light sources 106 can be configured to emit, respectively, a plurality of light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers.

In practice, one of the light sources 106 may be a laser diode configured to emit pulses of light. In particular, a laser diode may be a semiconductor device including a p-n junction with an active region in which oppositely polarized, energized charge carriers (e.g., free electrons and/or holes) recombine while current flows through the device across the p-n junction. The recombination results in emission of light due to a change in energy state of the charge carriers. When the active region is heavily populated by such energized pairs (e.g., the active region may have a population inversion of energized states), stimulated emission across the active region may produce a substantially coherent wave front of light that is then emitted from the laser diode. Recombination events, and the resulting light emission, occur in response to current flowing through the device, and so applying a pulse of current to the laser diode results in emission of a pulse of light from the laser diode.

As such, the present disclosure will be generally described herein in the context of a laser diode being used as the primary light source 106. In some arrangements, however, the one or more light sources 106 may additionally or alternatively include fiber lasers, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), and/or any other device configured to selectively transmit, reflect, and/or emit light to provide the plurality of emitted light beams and/or pulses.

Furthermore, transmitter 108 may be configured to emit light into an environment. In particular, the transmitter 108 may include an optical arrangement that is arranged to direct light from a light source 106 toward the environment. This optical arrangement may include any feasible combination of mirror(s) used to guide propagation of the light throughout physical space and/or lens(es) used to adjust certain characteristics of the light, among other optical components. For instance, the optical arrangement may include a transmit lens arranged to collimate the light, thereby resulting in light having rays that are substantially parallel to one another. Moreover, the lens may be shaped to spread or otherwise scatter light in a particular manner, such as by causing the vertical light spread of +7° away from a horizontal axis to −18° away from the horizontal axis (e.g., the horizontal axis ideally being parallel to a ground surface in the environment) for example.

As noted, the LIDAR device 100 may include at least one receiver 110. The receiver 110 may be respectively configured to at least detect light having wavelengths in the same wavelength range as the one of the light emitted from the transmitter 108. In doing so, the receiver 110 may detect light with a particular resolution. For example, the receiver 110 may be configured to detect light with a 0.036° (horizontal)×0.067° (vertical) angular resolution. Moreover, the receiver 110 may be configured to scan the environment with a particular FOV. For example, the receiver 110 may be arranged to focus incoming light within a range of +7° away from the above-mentioned horizontal axis to −18° away from the horizontal axis. In this way, the receiver 110 allows for detection of light along a range of +7° to −18°, which matches the above-mentioned exemplary vertical spread of emitted light that the transmitter 108 provides. It is noted that this resolution and FOV are described for exemplary purposes only and are not meant to be limiting.

In an example implementation, the receiver 110 may have an optical arrangement that allows the receiver 110 to provide the resolution and FOV as described above. Generally, such an optical arrangement may be arranged to provide an optical path between at least one optical lens and a photodetector array.

More specifically, the receiver 110 may include an optical lens arranged to focus light reflected from one or more objects in the environment of the LIDAR device 100 onto detectors of the receiver 110. To do so, the optical lens may have certain dimensions (e.g., approximately 10 cm×5 cm) as well as a certain focal length (e.g., approximately 35 cm). Moreover, the optical lens may be shaped so as to focus incoming light along a particular vertical FOV as described above (e.g., +7° to −18°). Such shaping of the first receiver's optical lens may take on one of various forms (e.g., spherical shaping) without departing from the scope of the present disclosure.

Furthermore, as noted, the receiver 110 may have a photodetector array, which may include two or more detectors each configured to convert detected light (e.g., in the above-mentioned wavelength range) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner. For example, the photodetector array may include a 13×16 array of detectors. It is noted that this photodetector array is described for exemplary purposes only and is not meant to be limiting.

Generally, the detectors of the array may take various forms. For example, the detectors may take the form of photodiodes, avalanche photodiodes (e.g., geiger mode and/or linear mode avalanche photodiodes), phototransistors, cameras, active pixel sensors (APS), charge coupled devices (CCD), cryogenic detectors, and/or any other sensor of light configured to receive focused light having wavelengths in the wavelength range of the emitted light. Other examples are possible as well.

Further, as noted, the LIDAR device 100 may include a rotating platform 112 that is configured to rotate about an axis. In order to rotate in this manner, one or more actuators 114 may actuate the rotating platform 112. In practice, these actuators 114 may include motors, pneumatic actuators, hydraulic pistons, and/or piezoelectric actuators, among other possibilities.

In an example implementation, the transmitter 108 and the receiver 110 may be arranged on the rotating platform 112 such that each of these components moves relative to the environment based on rotation of the rotating platform 112. In particular, each of these components could be rotated relative to an axis so that the LIDAR device 100 may obtain information from various directions. In this manner, the LIDAR device 100 may have a horizontal viewing direction that can be adjusted by actuating the rotating platform 112 to different directions.

With this arrangement, a computing system could direct an actuator 114 to rotate the rotating platform 112 in various ways so as to obtain information about the environment in various ways. In particular, the rotating platform 112 could rotate at various extents and in either direction. For example, the rotating platform 112 may carry out full revolutions such that the LIDAR device 100 provides a 360° horizontal FOV of the environment. Thus, given that the receiver 110 may rotate based on rotation of the rotating platform 112, the receiver 110 may have a horizontal FOV (e.g., 360° or less) and also a vertical FOV as described above.

Moreover, the rotating platform 112 could rotate at various rates so as to cause LIDAR device 100 to scan the environment at various refresh rates. For example, the LIDAR device 100 may be configured to have a refresh rate of 15 Hz (e.g., fifteen complete rotations of the LIDAR device 100 per second). In this example, assuming that the LIDAR device 100 is coupled to a vehicle as further described below, the scanning thus involves scanning a 360° FOV around the vehicle fifteen times every second. Other examples are also possible. For example, the rotating platform 112 could swivel the LIDAR device so that it scans back and forth within a smaller angle horizontal FOV.

Yet further, as noted, the LIDAR device 100 may include a stationary platform 116. In practice, the stationary platform 116 may take on any shape or form and may be configured for coupling to various structures, such as to a top of a vehicle for example. Also, the coupling of the stationary platform 116 may be carried out via any feasible connector arrangement 118 (e.g., bolts, screws, and/or adhesives). In this way, the LIDAR device 100 could be coupled to a structure so as to be used for various purposes, such as those described herein.

Furthermore, the LIDAR device 100 may also include a rotary link 120 that directly or indirectly couples the stationary platform 116 to the rotating platform 112. Specifically, the rotary link 120 may take on any shape, form and material that provides for rotation of the rotating platform 112 about an axis relative to the stationary platform 116. For instance, the rotary link 120 may take the form of a shaft or the like that rotates based on actuation from an actuator 114, thereby transferring mechanical forces from the actuator 114 to the rotating platform 112. Moreover, as noted, the rotary link 120 may have a central cavity in which electronics 104 and/or one or more other components of the LIDAR device 100 may be disposed. Other arrangements are possible as well.

Yet further, as noted, the LIDAR device 100 may include a housing 122. In practice, the housing 122 may take on any shape and form. For example, the housing 122 can be a dome-shaped housing, among other possibilities. Moreover, the housing 122 may be arranged in various ways relative to other components of the LIDAR device 100. It is noted that this housing is described for exemplary purposes only and is not meant to be limiting.

In an example implementation, the housing 122 may be coupled to the rotating platform 112 such that the housing 122 is configured to rotate about the above-mentioned axis based on rotation of the rotating platform 112. With this implementation, the transmitter 108, the receiver 110, and possibly other components of the LIDAR device 100 may each be disposed within the housing 122. In this manner, the transmitter 108 and the receiver 110 may rotate along with this housing 122 while being disposed within the housing 122.

Moreover, the housing 122 may have an aperture formed thereon, which could take on any feasible shape and size. In this regard, the transmitter 108 could be arranged within the housing 122 so as to emit light into the environment through the aperture. In this way, the transmitter 108 may rotate along with the aperture due to corresponding rotation of the housing 122, thereby allowing for emission of light into various directions. Also, the receiver 110 could be arranged within the housing 122 so as to detect light that enters the housing 122 from the environment through the aperture. In this way, the receiver 110 may rotate along with the aperture due to corresponding rotating of the housing 122, thereby allowing for detection of the light incoming from various directions along the horizontal FOV.

Yet further, the housing 122 may be composed of a material that is at least partially non-transparent, except for the aperture, which could be composed of a transparent material. In this way, light could propagate through the aperture, thereby allowing for scanning of the environment. But due to the housing 122 being at least partially non-transparent, the housing 122 may block at least some light from entering the interior space of the housing 122 and thus may help mitigate thermal effects. For instance, the housing 122 may block sun rays from entering the interior space of the housing 122, which may help avoid overheating of various components of the LIDAR device 100 due to those sun rays. Moreover, due to various components of the LIDAR device 100 being disposed within the housing 122 and due to the housing 122 rotating along with those components, the housing 122 may help protect those components from various environmental hazards, such as rain and/or snow, among others.

In other implementations, however, the housing 122 may be an exterior stationary housing that does not rotate with the LIDAR device 100. For example, the exterior stationary housing could be coupled to a vehicle and the LIDAR device could also be coupled to the vehicle while being configured to rotate within the exterior stationary housing. In this situation, the exterior stationary housing would likely be transparent so as to allow for propagation of light through the exterior stationary housing and thus for scanning of the environment by the LIDAR device 100. Moreover, the LIDAR device 100 may also include an aperture through which light may propagate and such an aperture may be on an interior housing of the LIDAR device 100, which may rotate within the exterior stationary housing along with other components of the LIDAR device 100. Other implementations are possible as well.

III. ILLUSTRATIVE IMPLEMENTATION OF THE LIDAR DEVICE

Figure 2A:
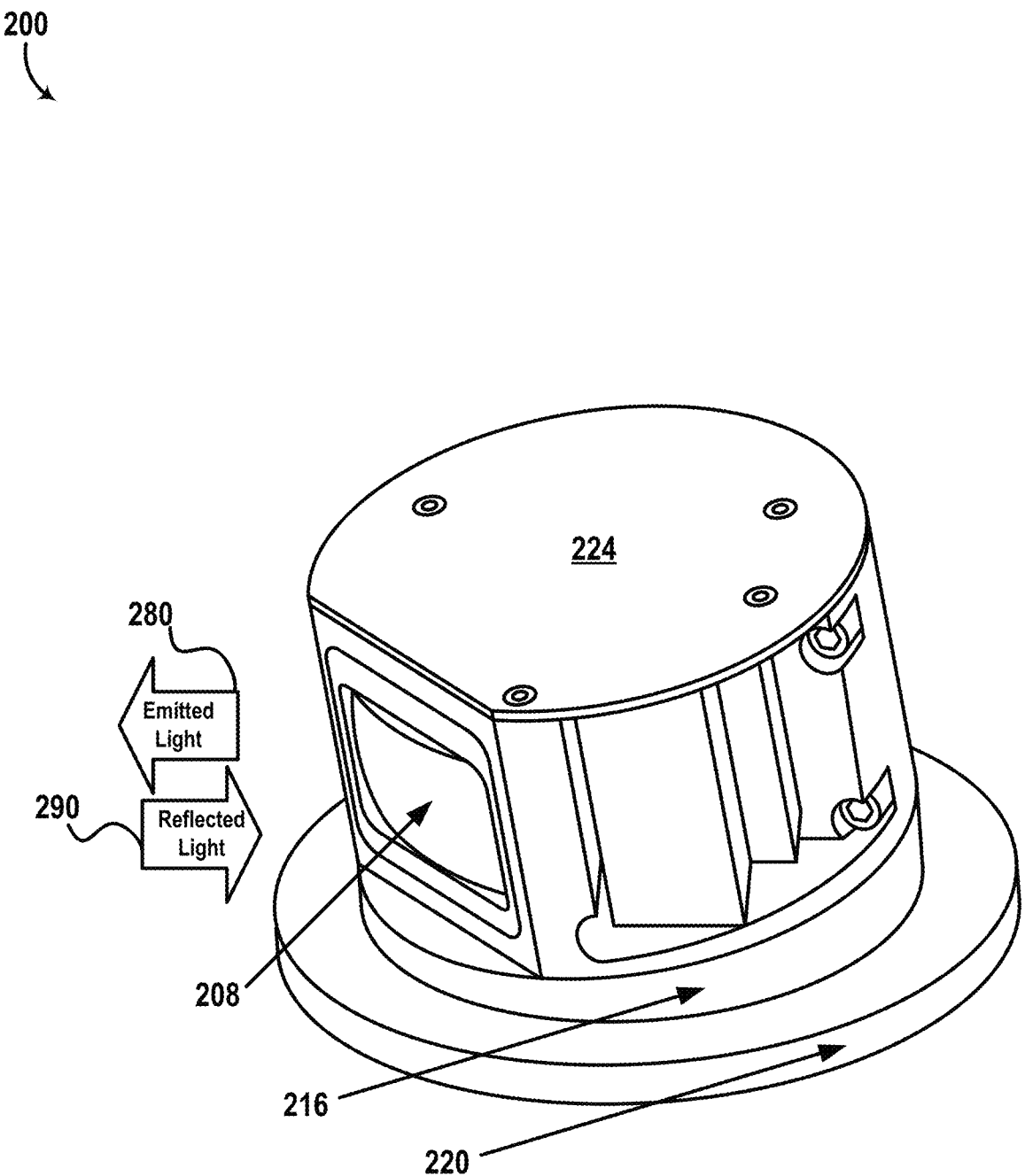
FIG. 2A illustrates a LIDAR device, according to an example embodiment.

FIG. 2A illustrates a LIDAR device 200, according to an example embodiment. LIDAR 200 may be similar to LIDAR 100. For example, as shown, LIDAR device 200 includes a lens 208, a rotating platform 216, a stationary platform 220, and a housing 224 which may be similar, respectively, to optical element 108, rotating platform 216, stationary platform 120, and housing 124. Additionally, as shown, light beams 280 emitted by LIDAR device 200 propagate from lens 108 along a pointing direction of LIDAR 200 toward an environment of LIDAR device 200, and reflect off one or more objects in the environment as reflected light 290.

In some examples, housing 224 can be configured to have a substantially cylindrical shape and to rotate about an axis of LIDAR device 200. In one example, housing 224 can have a diameter of approximately 10 centimeters. Other examples are possible. In some examples, the axis of rotation of LIDAR device 200 is substantially vertical. For instance, by rotating housing 224 that includes the various components a three-dimensional map of a 360-degree view of the environment of LIDAR device 200 can be determined. Additionally or alternatively, in some examples, LIDAR device 200 can be configured to tilt the axis of rotation of housing 224 to control a field of view of LIDAR device 200. Thus, in some examples, rotating platform 216 may comprise a movable platform that may tilt in one or more directions to change the axis of rotation of LIDAR device 200.

In some examples, lens 208 can have an optical power to both collimate the emitted light beams 280, and focus the reflected light 290 from one or more objects in the environment of LIDAR device 200 onto detectors in LIDAR device 200. In one example, lens 208 has a focal length of approximately 120 mm. Other example focal lengths are possible. By using the same lens 208 to perform both of these functions, instead of a transmit lens for collimating and a receive lens for focusing, advantages with respect to size, cost, and/or complexity can be provided. Alternatively, LIDAR 200 may include separate transmit and receive lenses.

Figure 2B:
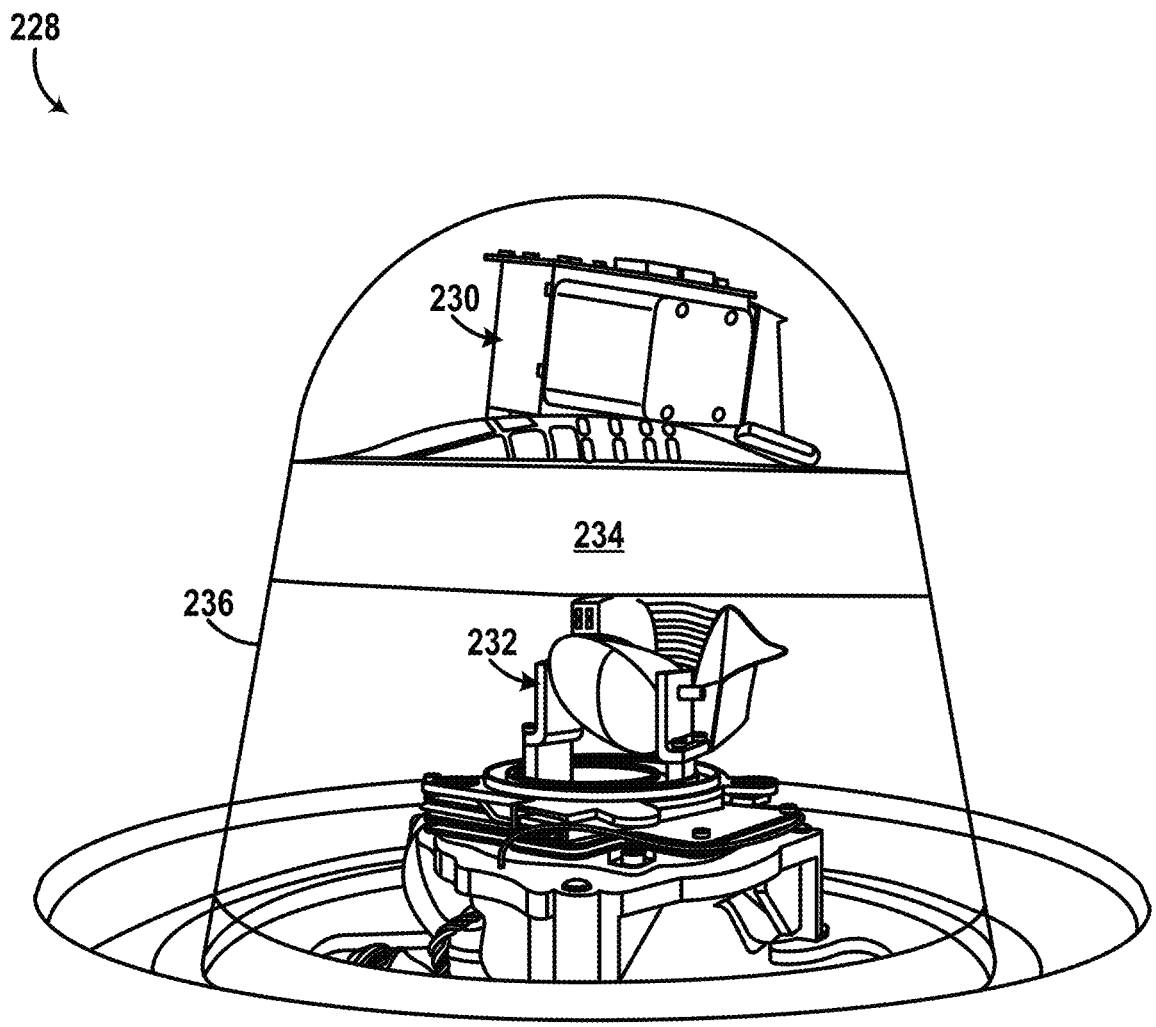
FIG. 2B illustrates another LIDAR system, according to an example embodiment.

FIG. 2B illustrates another possible implementation of a LIDAR system, according to an example embodiment. As shown, a LIDAR system 228 could include a first LIDAR 230, a second LIDAR 232, a dividing structure 234, and light filter 236.

In some examples, the first LIDAR 230 may be configured to scan an environment around a vehicle by rotating about an axis (e.g., vertical axis, etc.) continuously while emitting one or more light pulses and detecting reflected light pulses off objects in the environment of the vehicle, for example. In some embodiments, the first LIDAR 230 may be configured to repeatedly rotate about the axis to be able to scan the environment at a sufficiently high refresh rate to quickly detect motion of objects in the environment. For instance, the first LIDAR 230 may have a refresh rate of 10 Hz (e.g., ten complete rotations of the first LIDAR 230 per second), thereby scanning a 360-degree FOV around the vehicle ten times every second. Through this process, for instance, a 3D map of the surrounding environment may be determined based on data from the first LIDAR 230. In one embodiment, the first LIDAR 230 may include a plurality of light sources that emit 64 laser beams having a wavelength of 905 nm. In this embodiment, the 3D map determined based on the data from the first LIDAR 230 may have a 0.2° (horizontal)×0.3° (vertical) angular resolution, and the first LIDAR 230 may have a 360° (horizontal)×20° (vertical) FOV of the environment. In this embodiment, the 3D map may have sufficient resolution to detect or identify objects within a medium range of 100 meters from a vehicle, for example. However, other configurations (e.g., number of light sources, angular resolution, wavelength, range, etc.) are possible as well.

Unlike the first LIDAR 230, in some embodiments, the second LIDAR 232 may be configured to scan a narrower FOV of the environment around a vehicle. For instance, the second LIDAR 232 may be configured to rotate (horizontally) for less than a complete rotation about a similar axis. Further, in some examples, the second LIDAR 232 may have a lower refresh rate than the first LIDAR 230. Through this process, a vehicle may determine a 3D map of the narrower FOV of the environment using the data from the second LIDAR 232. The 3D map in this case may have a higher angular resolution than the corresponding 3D map determined based on the data from the first LIDAR 230, and may thus allow detection/identification of objects that are further than the medium range of distances of the first LIDAR 230, as well as identification of smaller objects within the medium range of distances. In one embodiment, the second LIDAR 232 may have a FOV of 8° (horizontal)× 15° (vertical), a refresh rate of 4 Hz, and may emit one narrow beam having a wavelength of 1550 nm. In this embodiment, the 3D map determined based on the data from the second LIDAR 232 may have an angular resolution of 0.1° (horizontal)×0.03° (vertical), thereby allowing detection/identification of objects within a range of around three hundred meters from a vehicle. However, other configurations (e.g., number of light sources, angular resolution, wavelength, range, etc.) are possible as well.

In some examples, a vehicle may be configured to adjust a viewing direction of the second LIDAR 232. For example, while the second LIDAR 232 has a narrow horizontal FOV (e.g., 8 degrees), the second LIDAR 232 may be mounted to a stepper motor (not shown) that allows adjusting the viewing direction of the second LIDAR 232 to pointing directions other than that shown in FIG. 1B. Thus, in some examples, the second LIDAR 232 may be steerable to scan the narrow FOV along any pointing direction from a vehicle.

The dividing structure 234 may be formed from any solid material suitable for supporting the first LIDAR 230 and/or optically isolating the first LIDAR 230 from the second LIDAR 232. Example materials may include metals, plastics, foam, among other possibilities.

The light filter 236 may be formed from any material that is substantially transparent to light having wavelengths with a wavelength range, and substantially opaque to light having wavelengths outside the wavelength range. For example, the light filter 236 may allow light having the first wavelength of the first LIDAR 230 (e.g., 905 nm) and the second wavelength of the second LIDAR 232 (e.g., 1550 nm) to propagate through the light filter 236. As shown, the light filter 236 is shaped to enclose the first LIDAR 230 and the second LIDAR 232. Thus, in some examples, the light filter 236 may also be configured to prevent environmental damage to the first LIDAR 230 and the second LIDAR 232, such as accumulation of dust or collision with airborne debris, among other possibilities. In some examples, the light filter 236 may be configured to reduce visible light propagating through the light filter 236. In turn, the light filter 236 may improve an aesthetic appearance of a vehicle by enclosing the first LIDAR 230 and the second LIDAR 232, while reducing visibility of the components of the sensor unit 228 from a perspective of an outside observer, for example. In other examples, the light filter 236 may be configured to allow visible light as well as the light from the first LIDAR 230 and the second LIDAR 232.

In some embodiments, portions of the light filter 236 may be configured to allow different wavelength ranges to propagate through the light filter 236. For example, an upper portion of the light filter 236 above the dividing structure 234 may be configured to allow propagation of light within a first wavelength range that includes the first wavelength of the first LIDAR 230. Further, for example, a lower portion of the light filter 236 below the dividing structure 234 may be configured to allow propagation of light within a second wavelength range that includes the second wavelength of the second LIDAR 232. In other embodiments, the wavelength range associated with the light filter 236 may include both the first wavelength of the first LIDAR 230 and the second wavelength of the second LIDAR 232.

FIGS. 3A to 3D next collectively illustrate implementation of a LIDAR device in a vehicle 300, specifically illustrating an implementation of the example LIDAR device 200 in the vehicle 300. Although vehicle 300 is illustrated as a car, other embodiments are possible. Furthermore, although the example vehicle 300 is shown as a vehicle that may be configured to operate in autonomous mode, the embodiments described herein are also applicable to vehicles that are not configured to operate autonomously. Thus, the example vehicle 300 is not meant to be limiting.

Figure 3A:
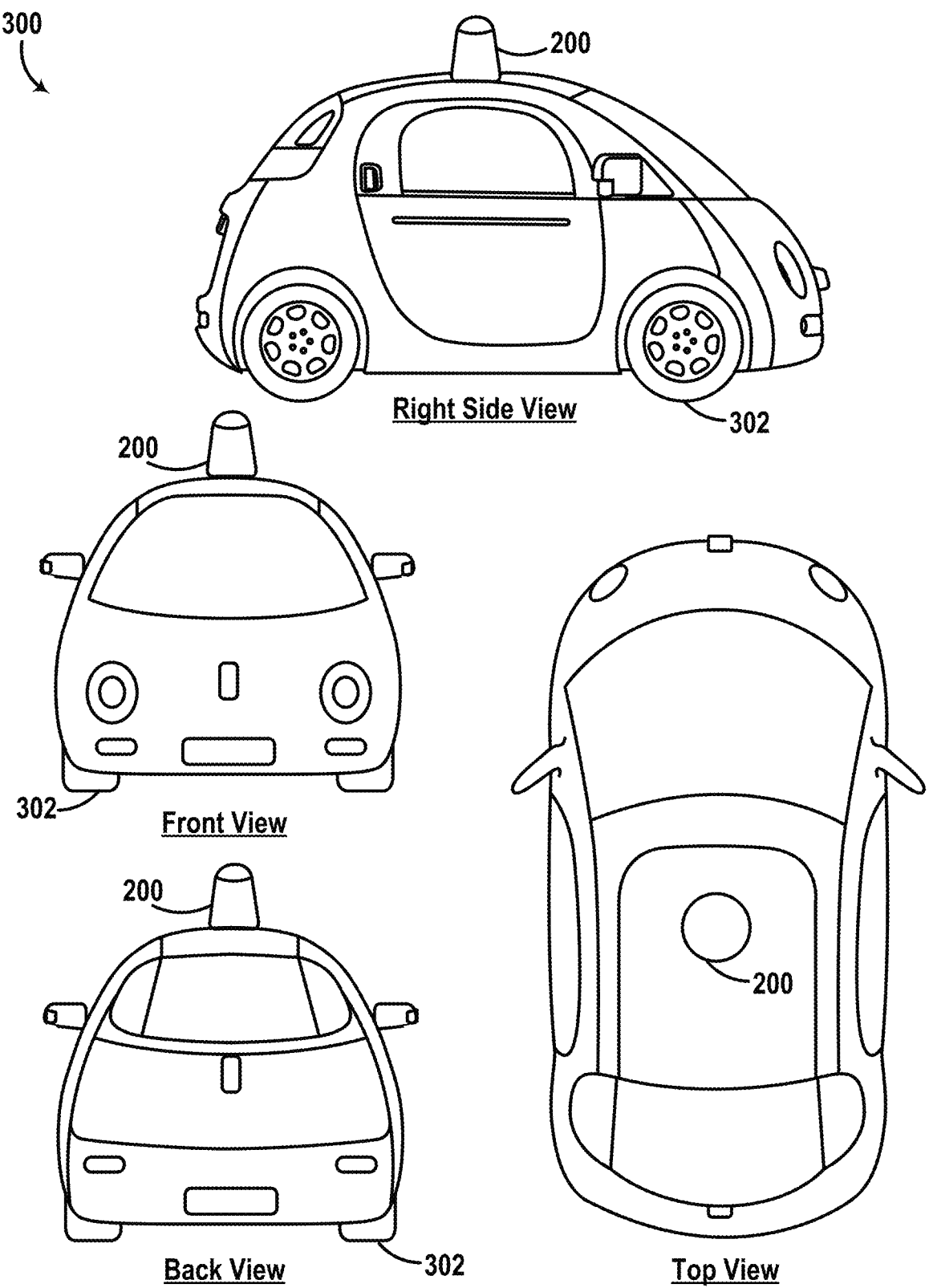
FIG. 3A shows several views of a LIDAR device being positioned on top of a vehicle, according to an example embodiment.

In particular, FIG. 3A shows a Right Side View, Front View, Back View, and Top View of the vehicle 300. As shown, the vehicle 300 includes the LIDAR device 200 being positioned on a top side of the vehicle 300 opposite a bottom side on which wheels 302 of the vehicle 300 are located. Although the LIDAR device 200 is shown and described as being positioned on the top side of the vehicle 300, the LIDAR device 200 could be positioned on any part feasible portion of the vehicle without departing from the scope of the present disclosure.

Figure 3B:
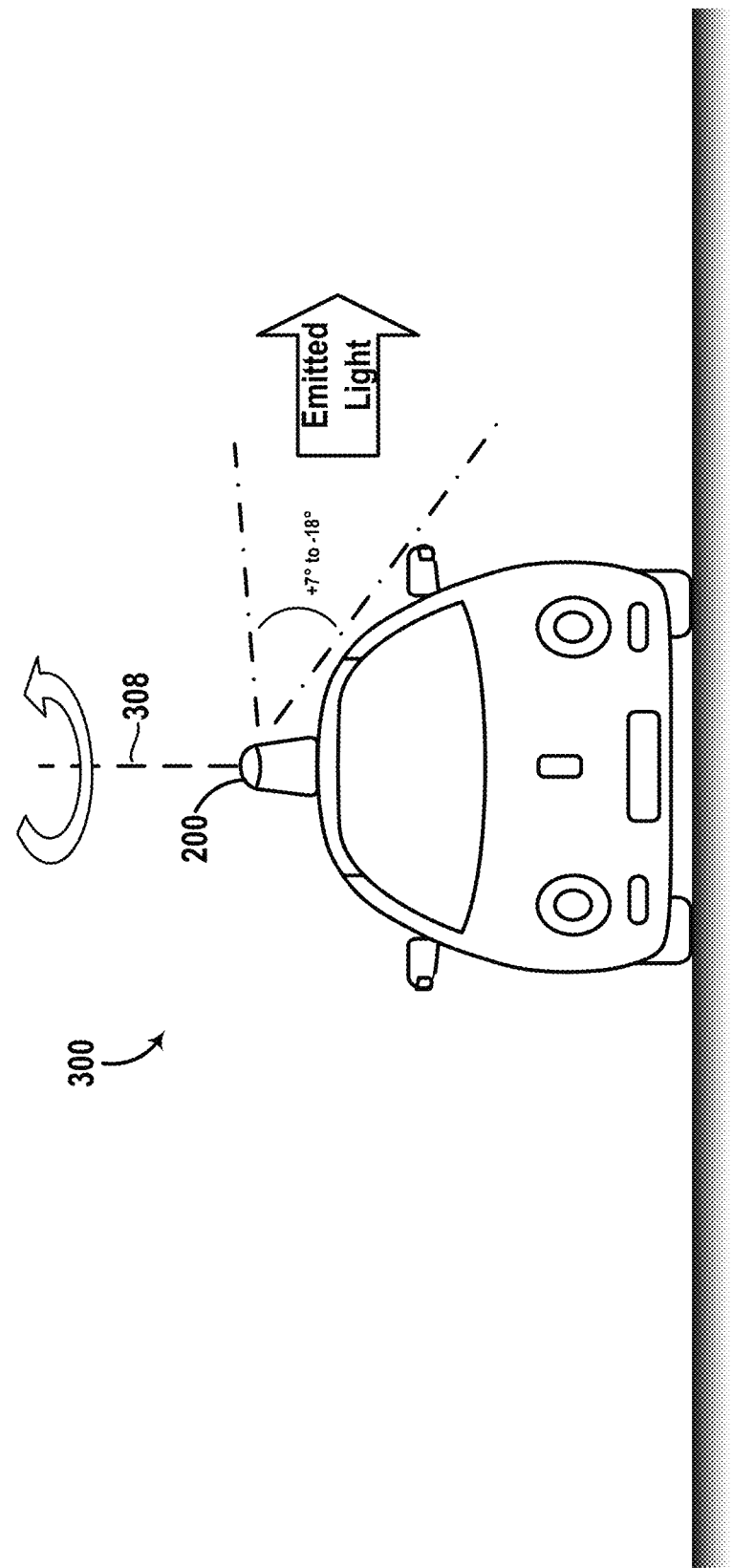
FIG. 3B shows emission of light by a LIDAR device positioned on top of the vehicle, according to an example embodiment.
Figure 3C:
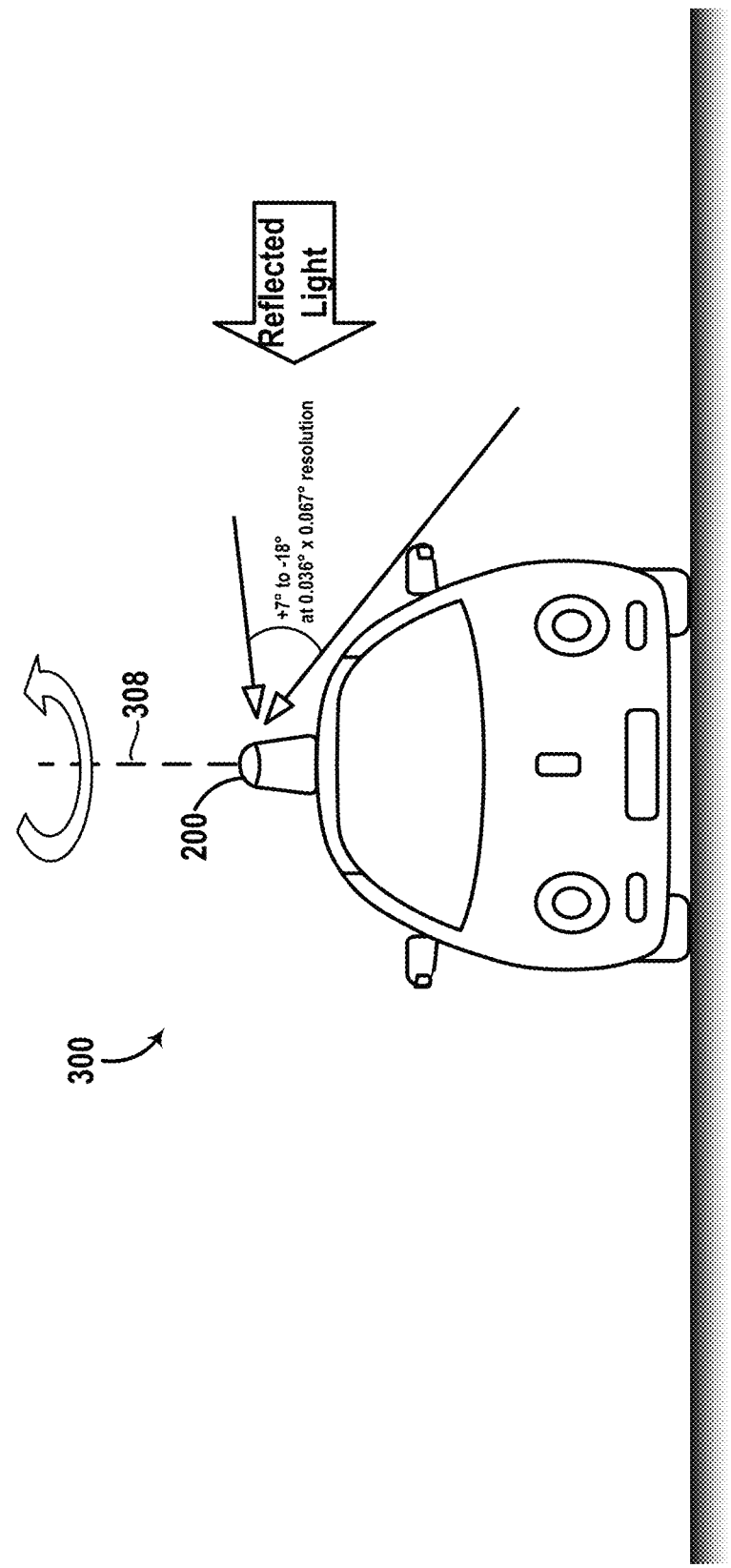
FIG. 3C shows detection of reflected light by a LIDAR device positioned on top of the vehicle, according to an example embodiment.

Moreover, FIGS. 3B to 3C next show that the LIDAR device 200 may be configured to scan an environment around the vehicle 300 (e.g., at a refresh rate of 15 Hz) by rotating about a vertical axis 308 while emitting one or more light pulses and detecting reflected light pulses off objects in the environment of the vehicle 300, for example.

More specifically, FIG. 3B shows that the LIDAR device 200 emits light with the above-mentioned vertical spread of +7° to −18°. In this way, the light emissions can be emitted toward regions of the environment that are relatively close to the vehicle 300 (e.g., a lane marker) and/or towards regions of the environment that are further away from the vehicle 300 (e.g., a road sign ahead of the vehicle).

Further, FIG. 3C shows that the LIDAR device 200 may detect reflected light with the above-mentioned vertical FOV of +7° to −18° and do so at a resolution of 0.036°×0.067°. In this way, the LIDAR device 200 may detect light reflected off regions of the environment that are relatively close to the vehicle 300 and/or light reflected off regions of the environment that are further away from the vehicle 300.

Figure 3D:
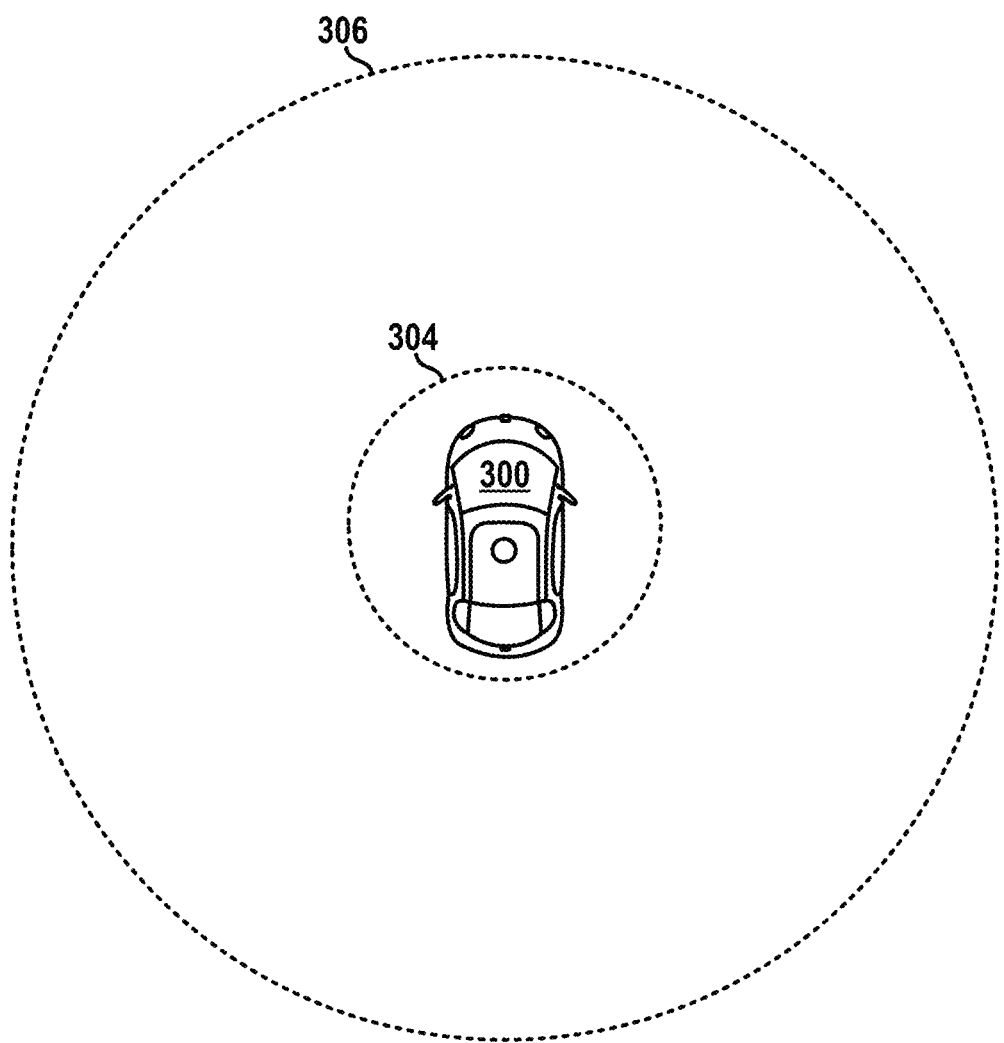
FIG. 3D shows a scanning range of a LIDAR device positioned on top of the vehicle, according to an example embodiment.

Generally, these detection distances are illustrated by way of example in FIG. 3D. In particular, FIG. 3D illustrates a top view of the vehicle 300 in the above-described scenario where the vehicle 300 uses the LIDAR device 200 for scanning a surrounding environment. Accordingly, the horizontal FOV of the LIDAR device 200 may span 360° in all directions around the vehicle 300.

As shown in FIG. 3D, the LIDAR device 200 may be suitable for detection and/or identification of objects within a range of distances to the vehicle 300. More specifically, objects outside of contour 304 and within a range of distances defined by the contour 306 may be properly detected/identified using the data from the LIDAR device 200. It is noted that these contours are not to scale but are illustrated as shown for convenience of description.

IV. NOMINAL DETECTION RANGE AND RANGE AMBIGUITY

Given that a LIDAR device may be suitable for detection of objects within a range of distances, the LIDAR device may have a nominal detection range that spans from a minimum unambiguous detection range to a maximum unambiguous detection range. For a given detection period of the LIDAR device, the maximum unambiguous detection range may define the greatest distance at which an object can be positioned away from the LIDAR device and be detected by the LIDAR device within the given detection period, as light pulses reflected from objects past the maximum unambiguous detection range may return to the LIDAR device after the given detection period ends. In contrast, for the given detection period, the minimum unambiguous detection range may define the minimum distance at which an object should be positioned away from the LIDAR device in order to be detected by the LIDAR device within the given detection period, as light pulses reflected from objects closer than the minimum distance may return to the LIDAR device before the given detection period begins.

More specifically, a computing system may operate the LIDAR device to emit and detect light pulses in accordance with certain timing. For example, the computing system may operate the LIDAR device to emit light pulses at emission times in accordance with an emission time sequence, which could be predefined or pseudo-random. This emission time sequence may then establish a detection time sequence according to which the LIDAR device detects return light pulses.

For instance, once the computing system operates the LIDAR device to emit a given light pulse, a corresponding detection period for the given light pulse may begin immediately following or at some time after emission of that given light pulse, and may end before or after emission of a subsequent light pulse, among other options. During this corresponding detection period, the LIDAR device could then detect a given return light pulse that corresponds to the given emitted light pulse, such as when the given emitted light pulse reflects off an object within the nominal detection range to result in that return light pulse. After the LIDAR device detects the given return light pulse, the computing system could then determine a specific range associated with the given return light pulse according to a time delay relative to the emission time of the given emitted light pulse.

As noted, a detection period may establish a nominal detection range that spans from a minimum unambiguous detection range to a maximum unambiguous detection range.

In particular, the time difference between the emission time of a light pulse and the end time of the detection period may correspond to a maximum time delay that a return light pulse from that emitted light pulse could have in order to still be detected by the LIDAR device during the detection period. For instance, if a detection period begins 1 nanosecond after emission of a light pulse and ends 400 nanoseconds (ns) after emission of that light pulse, in order for a return light pulse from that emitted light pulse to be detected by the LIDAR device during the nominal detection period, this light pulse should return to the LIDAR device within 400 ns. Further, because a computing system could determine a distance to an object according to a time delay between emission time of a light pulse and detection time of a reflected returning light pulse, the maximum time delay may establish the greatest distance at which an object could be positioned away from the LIDAR device, such that the LIDAR device could still detect during the detection period a light pulse that reflected off this object and then returned to the LIDAR. Generally, this greatest distance may define the maximum unambiguous detection range for the detection period.

Additionally, the time difference between emission time of a light pulse and the start time of the detection period may correspond to a minimum time delay that a return light pulse should have in order to be detected by the LIDAR device during the nominal detection period. For instance, if a detection period starts 50 nanoseconds (ns) after emission of a light pulse, in order for a return light pulse to be detected by the LIDAR device during that detection period after the light pulse is emitted by the LIDAR device, this light pulse may have to return to the LIDAR device after no less than 50 ns. Further, because a computing system could determine a distance to an object according to a time delay between emission time of a light pulse and detection of a reflected returning light pulse, the minimum time delay may establish the minimum distance at which an object should be positioned away from the LIDAR device, such that the LIDAR device could still detect during the detection period a light pulse that reflected off this object and then returned to the LIDAR. Generally, this minimum distance may define the minimum unambiguous detection range for the detection period.

With this arrangement, if a light pulse is reflected off an object positioned outside the nominal detection range, a computing system may not determine a range associated with that light pulse or could determine an incorrect range associated with that light pulse.

By way of example, in many situations, if a light pulse is reflected off an object positioned beyond a maximum unambiguous detection range, the LIDAR device may not detect such a light pulse, as this light pulse may experience a significant attenuation in its intensity before arriving at the LIDAR device. Consequently, the computing system may not determine a range associated with that light pulse.

In some situations, however, the LIDAR device may nonetheless detect that returning light pulse. For instance, the object positioned beyond the maximum unambiguous detection range may be a retroreflective object, such as a large road sign located beyond the maximum unambiguous detection range. A return light pulse that has reflected off such a retroreflective object may be detected by the LIDAR device during a subsequent detection period. Namely, when an emitted light pulse is reflected off a retroreflective object positioned beyond the maximum unambiguous detection range, the LIDAR device may detect this light pulse at a time after the device has stopped listening for a return signal from that emitted light pulse and instead at a time the device is listening for return signals from a subsequently emitted light pulse. Given this, the computing system may calculate the distance the light traveled based on the emission time of a later emitted pulse, because it was not expected to receive an un-attenuated return signal from an object located past the maximum unambiguous detection range. As a result, without range aliasing/ambiguity resilience, the computing system may erroneously determine that the retroreflective object is closer than it physically is from the LIDAR device In another example, in some situations, if a light pulse is reflected off an object positioned closer than a minimum unambiguous detection range, the LIDAR device may or may not detect such a light pulse. But if the LIDAR device does detect such a light pulse, that light pulse may arrive at the LIDAR device before start of the detection period, and thus the LIDAR device may not detect that light pulse in the detection period associated with that light pulse. Namely, when an emitted light pulse is reflected off an object positioned closer than the minimum unambiguous detection range, the LIDAR device could possibly detect this light pulse at a time before the device has started listening for a return signal from that emitted light pulse and instead at a time the device is listening for return signals from a previously emitted light pulse. As a result, the computing system may not determine a distance associated with this light pulse according to a time delay relative to an emission time of that light pulse.

Figure 4A:
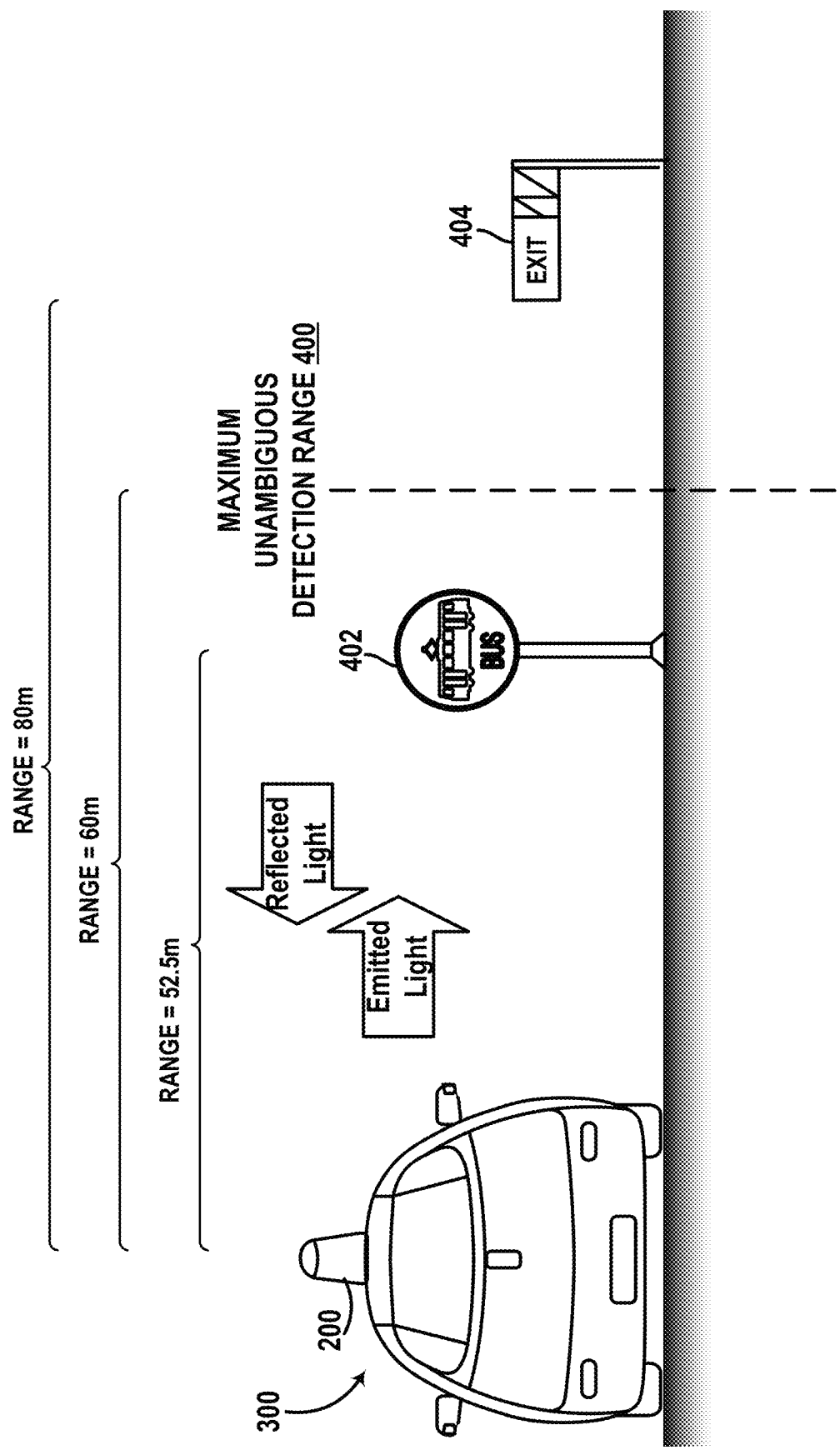
FIG. 4A shows a nominal unambiguous detection range of a LIDAR device positioned on top of the vehicle, according to an example embodiment.
Figure 4B:
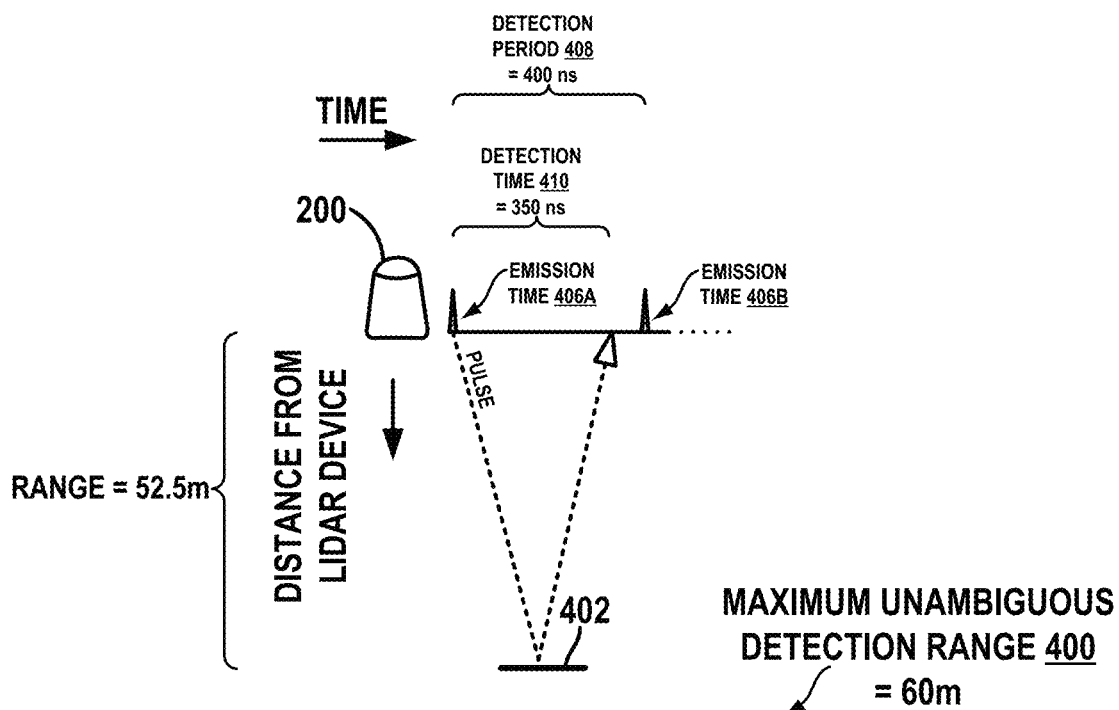
FIG. 4B shows a pulse reflected off an object positioned within a nominal unambiguous detection range of a LIDAR device, according to an example embodiment.
Figure 4C:
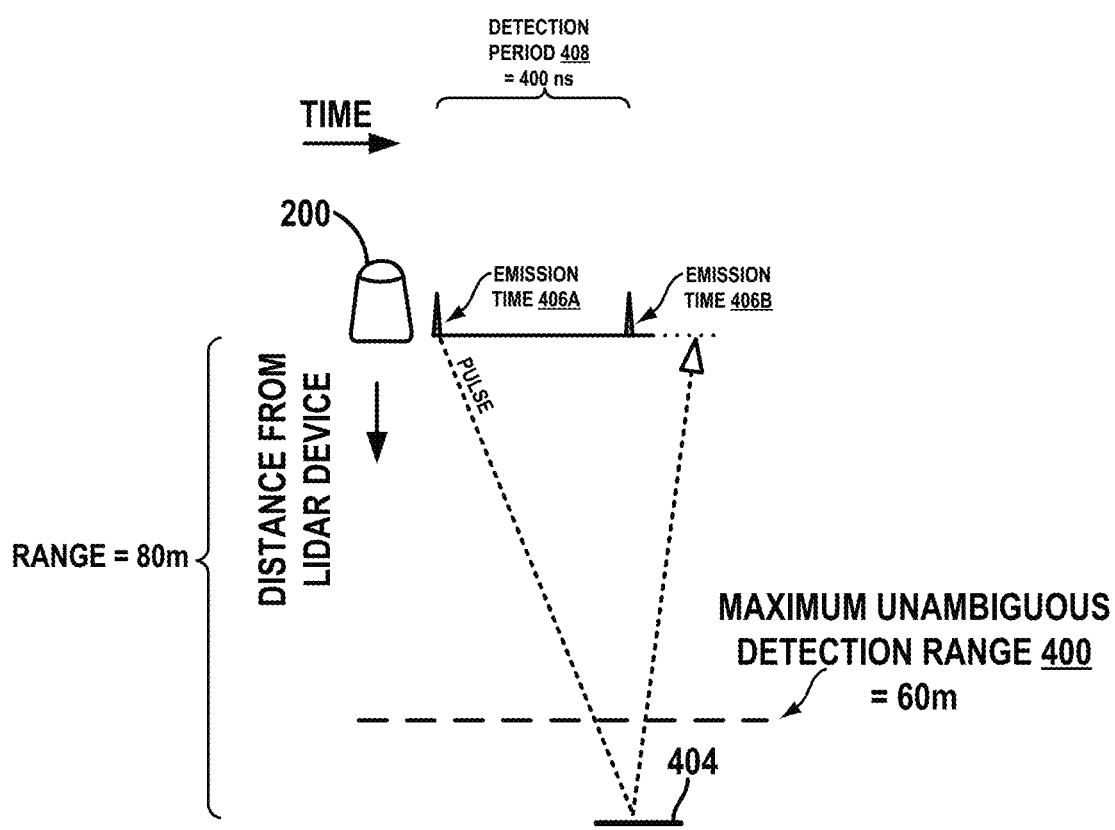
FIG. 4C shows a pulse reflected off an object positioned outside a nominal unambiguous detection range of a LIDAR device, according to an example embodiment.

FIGS. 4A-4C illustrate a nominal detection range of the LIDAR device 200. In particular, FIGS. 4A-4C show that the LIDAR device 200 may have a nominal detection range that spans from a minimum unambiguous detection range of 0 meters to a maximum unambiguous detection range 400 of 60 meters (60 m). In this example, this maximum unambiguous detection range 400 is established by the detection period 408 that starts following an emission time 406A of a light pulse and ends at a subsequent emission time 406B of a subsequent light pulse. As shown, the detection period 408 has a duration of 400 ns, which leads to the maximum unambiguous detection range 400 to be at approximately 60 m away from the LIDAR device 200 (maximum unambiguous detection range*2=speed of pulse*detection period=~299,792,458 m/s*400 ns).

Further, FIGS. 4A-4C illustrate that a nearby object 402 (e.g., a nearby road sign) could be positioned within the maximum unambiguous detection range 400 and that a distant object 404 (e.g., a retroreflective "freeway" road sign) could be positioned outside of the maximum unambiguous detection range 400. In this regard, FIG. 4B shows that a pulse reflected off the nearby object 402 would return to the LIDAR device 200 before the end of the detection period 408 and would do so at a detection time 410 of 350 ns after the emission time 406A. This detection time 410 corresponds to a range of 52.5 m, which is the distance at which the nearby object 402 is positioned away from the LIDAR device 200. In contrast, distant object 404 is positioned at a distance of 80 m away from the LIDAR device 200, which is a distance that exceeds the maximum unambiguous detection range 400 of 60 m. Therefore, as shown in FIG. 4C, a pulse reflected off the distant object 404 would return to the LIDAR device 200 after the end of the detection period 408 and thus would not be detected by the LIDAR device 200 during that detection period 408. Other illustrations are possible as well.

Given that a light pulse could reflect off an object positioned outside of a nominal detection range of a LIDAR device and then be detected by the LIDAR device, a computing system could encounter range aliasing/ambiguity. In particular, when the computing system determines that the LIDAR device detected a return light pulse, the computing system could determine a range for that return light pulse according to a time delay relative to an emission time of a most recently emitted light pulse, or could determine a range for that return light pulse according to a time delay relative to an emission time of another emitted light pulse. But without additional information, the computing system may be unable to determine with certainty which of these ranges is the correct range, which could give rise to range ambiguity, thereby possibly leading to false object detections, among other outcomes.

Figure 5A:
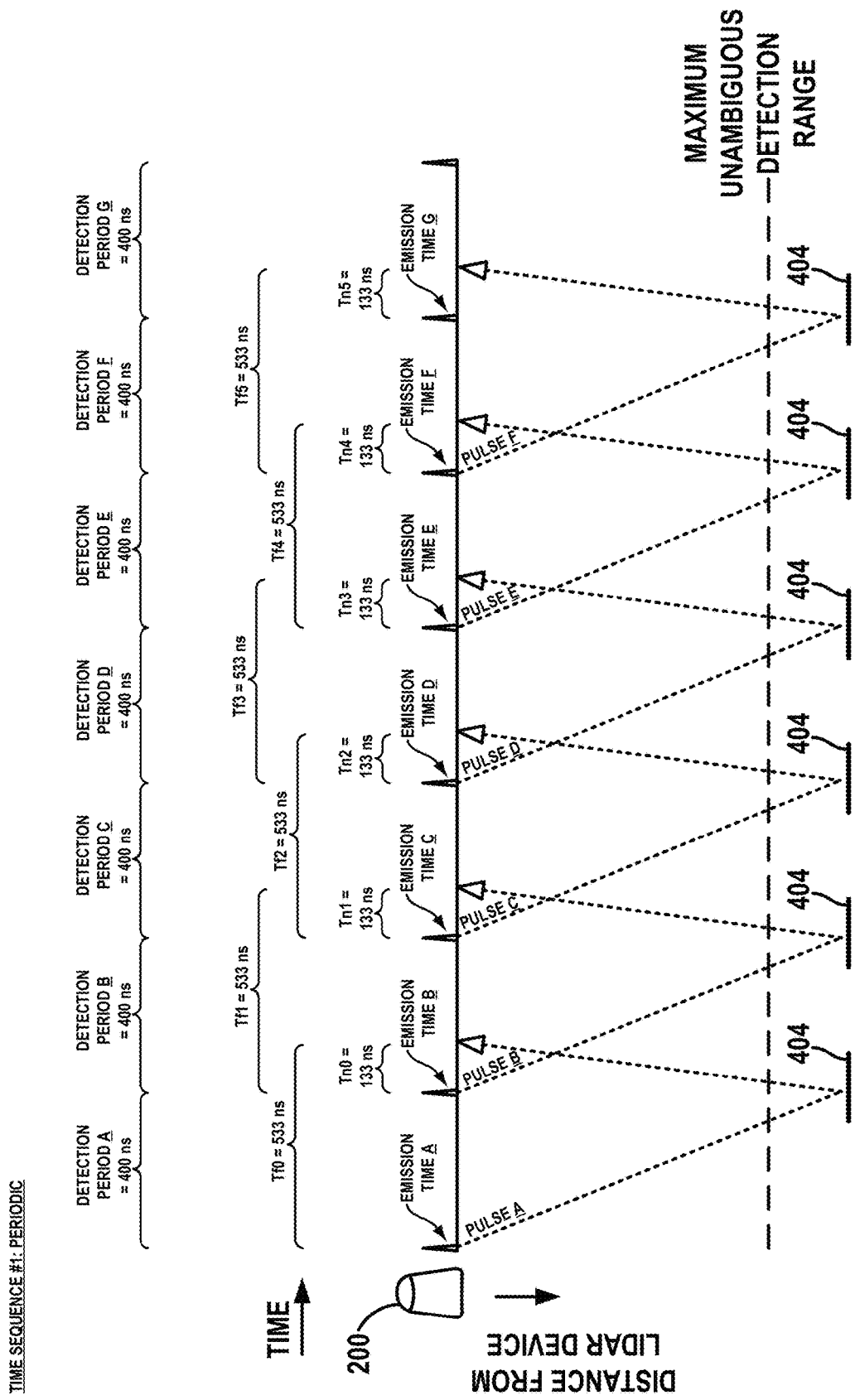
FIG. 5A shows a first time sequence and shows multiple possible detection times for each of a plurality of detected lights pulses, according to an example embodiment.
Figure 5B:
FIG. 5B shows range ambiguity with respect to the first time sequence, according to an example embodiment.

FIGS. 5A to 5B illustrate a scenario that could lead to range ambiguity.

In particular, FIG. 5A shows light pulses A-F emitted respectively at emission times A-F in accordance with a periodic time sequence #1. These periodic emission times establish detection periods A-F each of the same 400 ns duration. As shown, light pulses A-F each reflect off the distant object 404 and, as a result, are each respectively detected during a subsequent detection period.

Generally, the computing system could determine candidate ranges associated with detected light pulses A-F without accounting for the possibility of large retroreflective object(s) located beyond the maximum unambiguous detection range. For instance, the computing system may determine that the LIDAR device 200 detected light pulse A at a detection time Tn0 of 133 ns relative to emission time B, which corresponds to a range of 20 m as shown in FIG. 5B. And as indicated by detection times Tn1 to Tn5, a similar approach could be used for determining ranges associated with light pulses B-F, thereby resulting in first ranges 502 corresponding to a close range hypothesis of an object being positioned at 20 m away from the LIDAR device 200.

Given this, the computing system determines that ranges 502 are the same as one another and/or that ranges 502 assemble a point cloud representative of an object and, as a result, could determine that these ranges 502 should be used as basis for further object detection (e.g., identification of the object or establishing a distance to the object as an average of the ranges 502). However, this close range hypothesis is inaccurate, as light pulses A-F in fact reflected off the distant object 404 that is positioned beyond the maximum unambiguous detection range of the LIDAR device 200. Thus, use of this close range hypothesis for object detection could lead to a false detection of a nearby object.

In some implementations, the computing system may also determine that the LIDAR device 200 detected light pulse A at a detection time Tf0 of 533 ns relative to emission time A, which corresponds to a range of 80 m as shown in FIG. 5B. And as indicated by detection times Tf1 to Tf5, a similar approach could be used for determining ranges associated with light pulses B-F, thereby resulting in second ranges 504 corresponding to a "far range hypothesis" of an object being positioned at 80 m away from the LIDAR device 200. This far range hypothesis is accurate, as light pulses A-F in fact reflected off the distant object 404 that is positioned beyond the maximum detection range of the LIDAR device 200.

However, although this far range hypothesis is accurate, the computing system may be unable to disambiguate between the close and far range hypotheses. Specifically, the computing system may determine a close range hypothesis including ranges 502 that are the same as one another and/or that assemble a point cloud representative of an object, and may in turn determine that this indicates an object is positioned at 20 m away from the LIDAR device 200. Additionally, the computing system may determine a far range hypothesis including ranges 504 that are the same as one another and/or that also assemble a point cloud representative of an object, and may in turn determine that this indicates an object is positioned at 80 m away from the LIDAR device 200. As a result, the computing system may determine that an object could be positioned at 20 m away from the LIDAR device 200 or at 80 m away from the LIDAR device 200. But without additional information, the computing system may be unable to determine which of these determinations is in fact accurate, thereby leading to range ambiguity. Other illustrations are also possible.

Generally, a computing system could carry out one or more range aliasing/ambiguity resilience techniques to help overcome range ambiguity and to possibly detect an object position outside of a nominal detection range of a LIDAR device. An example of such a technique involves application of time-varying dither to the emission time sequence as well as generation and evaluation of multiple range hypotheses. This technique is described in detail in application Ser. No. 15/638,607, which is incorporated herein by reference.

In accordance with the technique described in application Ser. No. 15/638,607, to help resolve range ambiguity, a computing system could operate a LIDAR device to emit light pulses in accordance with a time sequence that includes a time-varying dither, and, once return light pulses are detected, could generate and evaluate multiple range hypotheses. In some examples, one of the range hypotheses could be a close range hypotheses, and the computing system could generate one or more alternate range hypotheses in addition to the close range hypothesis. In other examples, instead of generating a close range hypothesis, the computing system could generate two or more alternate range hypotheses.

In this regard, various alternate range hypotheses are possible. By way of example, for each detected light pulse, the computing system could determine a range based on the difference between the detection time and a time a light pulse was emitted prior to the last emitted light pulse. In this example, the alternate range hypothesis could be referred to as a far range hypothesis, as the determined range corresponds to the possibility of an object being positioned beyond the maximum unambiguous detection range.

As such, when the computing system determines that the LIDAR device detected return light pulses during two or more detection periods, the computing system may determine (i) a first set of ranges in accordance with a time delay relative to corresponding emission times of a plurality of first emitted light pulses and (ii) a second set of ranges in accordance with a time delay relative to corresponding emission times of a plurality of second emitted light pulses.

Based on one or more factors, the computing system could then select between using the first set of ranges as a basis for object detection and using the second set of ranges as a basis for object detection. For instance, due to the application of time-varying dither, a range hypothesis that is incorrect would include a set of ranges that do not resemble any known object or are otherwise substantially different from one another. Whereas, despite application of time-varying dither, a range hypothesis that is correct could still include a set of ranges that resemble a known object or are otherwise substantially similar from one another. Therefore, the computing system could evaluate resemblance to known object(s) and/or similarity of ranges as basis for selecting between the sets of ranges.

By way of example, the computing system may determine that the first set of ranges closely resembles a known object and that the second set of ranges does not resemble any known objects, and the system may responsively select the first set of ranges to be used as basis for object detection. In another example, the system may determine that the first set includes ranges that are substantially similar to one another and that the second set includes ranges that are substantially different from one another, and the system may responsively select the first set of ranges to be used as basis for object detection.

As such, given this technique, the computing system could determine the appropriate ranges to use for basis for object detection, even when detected return light pulse(s) are light pulses that reflect off an object positioned outside the nominal detection range.

V. UTILIZATION OF EXTENDED DETECTION PERIODS IN A LIDAR SYSTEM

Figure 6:
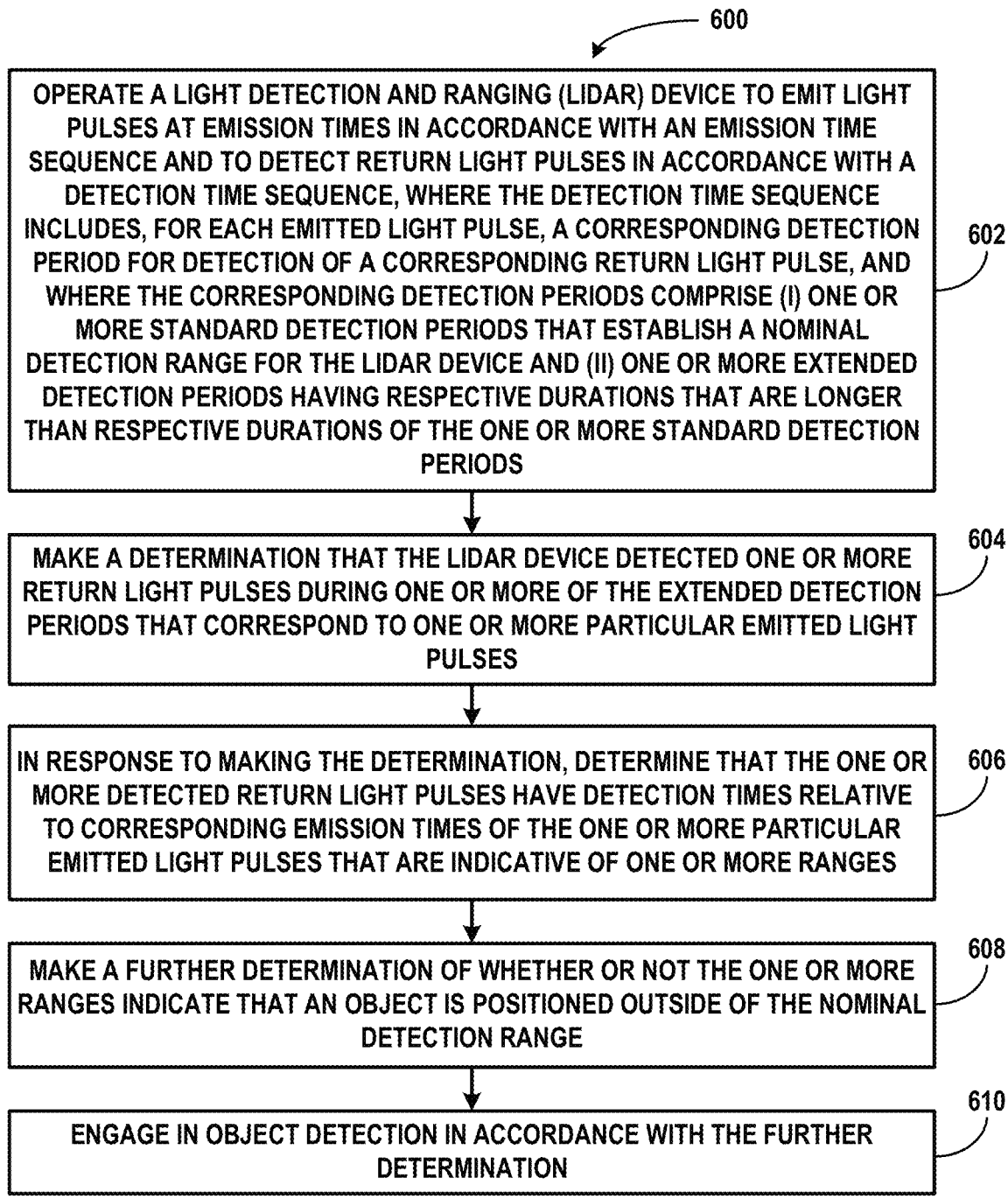
FIG. 6 is a flowchart illustrating a method for utilizing extended detection period(s) in a LIDAR system, according to an example embodiment.

FIG. 6 is a flowchart illustrating a method 600, according to an example implementation. In particular, method 600 may be implemented to help determine whether or not an object might be positioned outside of a nominal detection range of a LIDAR device, and to then engage in object detection accordingly.

Method 600 shown in FIG. 6 (and other processes and methods disclosed herein) presents a method that can be implemented within an arrangement involving, for example, the LIDAR device 100 of FIG. 1, vehicle 300 shown in FIGS. 3A-3D, and/or vehicle 900 shown in FIG. 9 and further described below (or more particularly by one or more components or subsystems thereof, such as by a processor and a non-transitory computer-readable medium having instructions that are executable to cause the device to perform functions described herein). Additionally or alternatively, method 600 may be implemented within any other arrangements and systems.

Method 600 and other processes and methods disclosed herein may include one or more operations, functions, or actions as illustrated by one or more of blocks 602-610. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of the present disclosure. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves operating a Light Detection and Ranging (LIDAR) device to emit light pulses at emission times in accordance with an emission time sequence and to detect return light pulses in accordance with a detection time sequence, where the detection time sequence includes, for each emitted light pulse, a corresponding detection period for detection of a corresponding return light pulse, and where the corresponding detection periods comprise (i) one or more standard detection periods that establish a nominal detection range for the LIDAR device and (ii) one or more extended detection periods having respective durations that are longer than respective durations of the one or more standard detection periods.

A computing system could operate a LIDAR device to emit and detect light pulses in accordance with certain timing. For instance, the computing system could operate the LIDAR device to emit light pulses in accordance with an emission time sequence, which could be a periodic emission time sequence or a non-periodic emission time sequence. In any case, the emission time sequence may help establish a detection time sequence according to which the LIDAR device detects return light pulses.

Specifically, the detection time sequence may include a corresponding detection period respectively for each emitted light pulse. In particular, a corresponding detection period for a given light pulse may begin immediately following or at some time after emission of that given light pulse, and may end before or after emission of a subsequent light pulse. During this corresponding detection period, the LIDAR device could detect a given return light pulse that corresponds to the given emitted light pulse, such as when the given emitted light pulse reflects off an object to result in that return light pulse. After the LIDAR device detects the given return light pulse at a certain detection time, the computing system could then determine a range to an object that reflected the given emitted light pulse. As discussed, the computing system could determine this range according to a time delay between the detection time of the given return light pulse and the emission time of the given emitted light pulse.

In accordance with the present disclosure, a LIDAR device's detection and emission time sequence could be arranged so as to include one or more standard detection periods and one or more extended detection periods. As further discussed herein, the extended detection period(s)

may have respective durations that are longer than respective durations of the standard detection period(s).

Generally, a standard detection period may begin and end in accordance certain timing relative to a light pulse emission. In practice, a standard detection period may begin at a start time that is within a first "standard-period" time frame after emission of a light pulse. By way of example, a start time of a standard detection period could be set to be anywhere between 2 ns and 4 ns after the light pulse emission (e.g., could be set at 3 ns after the light pulse emission). Additionally, a standard detection period may end at an end time that is within a second "standard-period" time frame after emission of a light pulse. By way of example, an end time of a standard detection period could be set to be anywhere between 390 ns and 410 ns after the light pulse emission (e.g., could be set at 400 ns after the light pulse emission).

When a time sequence is arranged to include multiple such standard detection periods, some or all of the standard detection periods could be the same as one another and/or some or all of the standard detection periods could be different from one another. For example, some or all of the standard detection periods could each have a start time of 3 ns after a corresponding light pulse emission and an end time of 400 ns after a corresponding light pulse emission. In another example, one of the standard detection periods could have a start time of 2.5 ns after a corresponding light pulse emission and an end time of 395 ns after the corresponding light pulse emission. Whereas, another one of the standard detection periods could have a start time of 3.2 ns after a corresponding light pulse emission and an end time of 405 ns after the corresponding light pulse emission. In this example, despite these detection periods having different start and end times, these detection periods would still be considered to be standard detection periods, as their start and ends times respectively fall within the above-mentioned first and second standard-period time frames.

In this regard, standard detection periods may establish the nominal detection range of the LIDAR device. In particular, if all of the standard detection periods are the same as one another, then the start and end times of these detection periods may establish the nominal detection range in accordance with the discussion above. However, if one or more of the standard detection periods are different than other standard detection period(s), then different standard detection periods could have different respective nominal detection ranges. In this case, the nominal detection range of the LIDAR define could define the distances at which an object can be positioned away from the LIDAR device and be reliably detected by the LIDAR device when taking all standard detection periods of the LIDAR device into consideration.

In particular, the standard detection period having an end time that provides for the greatest maximum time delay relative to a light pulse emission may establish a maximum detection range of the LIDAR device, and the standard detection period having the start time that provides for the smallest minimum time delay relative to a light pulse emission may establish a minimum unambiguous detection range of the LIDAR device. Other arrangements of standard detection periods are possible as well.

In contrast, an extended detection period may begin and end in accordance with certain timing relative to a light pulse emission, but that timing may cause the extended detection period to be of a longer duration than any one of the standard detection period(s). In particular, an extended detection period may begin at a start time that is within a first "extended-period" time frame after emission of a light pulse, with the first "extended-period" time frame being arranged earlier in time relative to a light pulse emission compared to timing of the first "standard-period" time frame. Additionally or alternatively, an extended detection period may end at an end time that is within a second "extended-period" time frame after emission of a light pulse, with the second "extended-period" time frame being arranged later in time relative to a light pulse emission compared to timing of the second "standard-period" time frame.

By way of example, a start time of an extended detection period could be set to be anywhere between 0 ns and 2 ns after a corresponding light pulse emission (e.g., could be set at 1 ns after the light pulse emission), which is earlier in time than the above-mentioned example "standard-period" time frame of 2 ns to 4 ns after the light pulse emission. Additionally or alternatively, an end time of an extended detection period could be set to be anywhere between 410 ns and 650 ns after a corresponding light pulse emission (e.g., could be set at 600 ns after the light pulse emission), which is later in time than the above-mentioned example "standard-period" time frame of 390 ns to 410 ns after the light pulse emission. Other examples are also possible.

When a time sequence is arranged to include multiple such extended detection periods, some or all of the extended detection periods could be the same as one another and/or some or all of the extended detection periods could be different from one another. For example, some or all of the extended detection periods could each have a start time of 1 ns after a corresponding light pulse emission and an end time of 600 ns after a corresponding light pulse emission. In another example, one of the extended detection periods could have a start time of 1.5 ns after a corresponding light pulse emission and an end time of 550 ns after the corresponding light pulse emission. Whereas, another one of the extended detection periods could have a start time of 1.7 ns after a corresponding light pulse emission and an end time of 570 ns after the corresponding light pulse emission. In this example, despite these detection periods having different start and end times, these detection periods would still be considered to be extended detection periods, as their start and ends times respectively fall within the above-mentioned first and second extended-period time frames.

With this arrangement, the extended detection period(s) may from time-to-time help extend the detection range of the LIDAR device. For example, if an extended detection period is arranged to have a respective end time (i.e., relative to a light pulse emission corresponding to the extended detection period) that is later in time than a standard detection period's respective end time (i.e., relative to a light pulse emission corresponding to the standard detection period), then the LIDAR device could detect during such extended detection period light pulse(s) that reflect off object(s) positioned beyond the maximum unambiguous detection range established by the standard detection period. In another example, if an extended detection period is arranged to have a respective start time (i.e., relative to a light pulse emission corresponding to the extended detection period) that is earlier in time than a standard detection period's respective start time (i.e., relative to a light pulse emission corresponding to the standard detection period), then the LIDAR device could detect during such extended detection period light pulse(s) that reflect off object(s) positioned closer than the minimum unambiguous detection range established by the standard detection period. Other arrangements of extended detection periods are possible as well.

Given an arrangement including extended and standard detection periods, the computing system could be arranged to emit and detect light pulses in accordance with a fixed schedule. In particular, the computing system may have stored thereon or may otherwise have access to a fixed schedule that indicates timing to respectively initiate and end the detection periods. For instance, the fixed schedule could specify a start time and/or an end time respectively for each extended detection period. In another instance, the fixed schedule could specify a start time and/or an end time respectively for each standard detection period. Moreover, the fixed schedule could specify how frequently and/or when extended detection periods should occur in a time sequence relative to standard detection periods. For example, the fixed schedule could specify that an extended detection period should be followed by ten standard detection periods, that these ten standard detection periods should be followed by another extended detection period, and that this other extended detection period should then be followed by another eight standard detection periods, and so on.

In other implementations, however, the computing system could be arranged to dynamically utilize extended detection periods in accordance with factors other than a fixed schedule. For instance, the computing system could determine information about an environment of an autonomous vehicle, such as based on data received from the autonomous vehicle's sensor system (e.g., from sensor(s) other than a LIDAR device). Based on the environment information, the computing system could then determine whether or not to operate the LIDAR device so as to enable or otherwise increase use of extended detection periods. In a specific example, the computing system could use data from a Global Positioning System (GPS) as basis to determine that the autonomous vehicle is entering a highway. And given that highways tend to include many retroreflective objects, the computing system could respond to the data from the GPS by enabling or otherwise increasing use of extended detection periods while the autonomous vehicle is driving on the highway. Other examples are also possible.

Regardless of whether or not the computing system operates the LIDAR device according to a fixed schedule, the computing system could be arranged to sparsely utilize extended detection periods during operation of the LIDAR device. Specifically, the computing system could be arranged to operate the LIDAR device such that standard detection periods occur more frequently over time compared to occurrences of extended detection periods. In this way, the computing system could advantageously utilize the extended detection periods as further described herein, and the more frequent occurrences of standard detection periods could provide for sufficiently high sampling rates during operation of the LIDAR device.

In this regard, the computing system could operate the LIDAR device such that extended detection periods occur periodically or non-periodically over time. Specifically, the computing system could operate the LIDAR device to initiate extended detection periods in accordance with a periodic sequence in which one in every X emitted light pulses has a corresponding extended detection period, with X being representative of a particular quantity. By way of example, the computing system could operate the LIDAR device such that one in 64 emitted light pulses has a corresponding extended detection period. In another arrangement, however, the computing system could operate the LIDAR device to initiate extended detection periods in accordance with a non-periodic sequence. For instance, the computing system could operate the LIDAR device such that extended detection periods occur in accordance with a pseudo-random sequence that is based on application of time-varying dither.

Furthermore, in some implementations, the computing system could operate the LIDAR device such that, when extended detection periods do occur, those extended detection periods correspond to emitted light pulses that are more prone to reflecting off an object positioned outside of the nominal detection range. In this way, when the LIDAR device does detect return light pulse(s) that reflected off object(s) positioned outside of the nominal detection range, there may be an increased likelihood of such return light pulse(s) being detected during extended detection period(s). This may in turn increase utilization of the extended detection periods for purposes of determining whether or not an object might be positioned outside of a nominal detection range, as further discussed herein.

By way of example, the computing system could operate the LIDAR device such that, when extended detection periods do occur, those extended detection periods correspond to light pulses emitted in one or more particular directions of travel. For instance, one such particular direction of travel could be a direction of travel that is substantially parallel to or elevated away from a ground surface, such as a ground surface (e.g., road) on which an autonomous vehicle is traveling. In this way, the computing system could operate the LIDAR device so as to avoid occurrences of extended detection periods that correspond to light pulses emitted towards the ground surface, as such emitted light pulses are less likely to reflect off an object positioned outside of the nominal detection range. As such, in practice, the computing system could operate the LIDAR device to emit a light pulse in one of the particular directions of travel at issue, and emission of that light pulse could be followed by an extended detection period arranged for detection of that light pulse once it returns as a result of being reflected off an object, which could be an object positioned outside of the nominal detection range. Other implementations are also possible.

At block 604, method 600 involves making a determination that the LIDAR device detected one or more return light pulses during one or more of the extended detection periods that correspond to one or more particular emitted light pulses.

In accordance with the present disclosure, the computing system could make a determination that the LIDAR device detected one or more return light pulses respectively during each of one or more extended detection periods. For instance, a plurality of emitted light pulses could each respectively have a corresponding extended detection period. For each such corresponding extended detection period, the computing system could determine that the LIDAR device detected one or more return light pulses. In practice, some or all of these light pulses could be light pulses that reflected off object(s) positioned outside the nominal detection range of the LIDAR device. Additionally or alternatively, some or all of these light pulses could be light pulses that reflected off nearby object(s) positioned within the nominal detection range.

In some cases, the computing system could additionally determine that the LIDAR device detected one or more return light pulses respectively during each of one or more standard detection periods. For instance, a plurality of emitted light pulses could each respectively have a corresponding standard detection period. For each such corresponding standard detection period, the computing system could determine that the LIDAR device detected one or more return light pulses. Here again, some or all of these light pulses could be light pulses that reflected off object(s) positioned outside the nominal detection range of the LIDAR device. Additionally or alternatively, some or all of these light pulses could be light pulses that reflected off nearby object(s) positioned within the nominal detection range.

In any case, as further discussed herein, detection of light pulse(s) during extended detection period(s) could help a computing system determine whether or not an object might be positioned outside the nominal detection range of the LIDAR device. And if the LIDAR device also detects light pulse(s) during standard detection period(s), then light pulse detection(s) during extended detection periods(s) could help a computing system overcome range ambiguity that could arise with regards to the light pulse detection(s) during standard detection period(s).

At block 606, method 600 involves, in response to making the determination, determining that the one or more detected return light pulses have detection times relative to corresponding emission times of the one or more particular emitted light pulses that are indicative of one or more ranges.

Once the computing system determines that the LIDAR device detected return light pulse(s) during extended detection period(s), the computing system may responsively generate a range hypothesis for these detected return light pulse(s). Specifically, the computing system may determine a range respectively for each detected return light pulse according to a time delay relative to an emission time of a most recently emitted light pulse. For example, after a given light pulse is emitted at a particular emission time and then detected during an extended detection period at a particular detection time, the computing system could then determine a range for that light pulse according to a time delay between the particular emission time and the particular detection time.

When the computing system determines a range for a light pulse detected during an extended detection period, this range determination can be more accurate than a range determination for a light pulse detected during a standard detection period.

Specifically, if a light pulse has a corresponding standard detection period and that light pulse is reflected off an object positioned outside of the nominal detection range, that light pulse would not be detected by the LIDAR device during its corresponding standard period. In this scenario, as discussed, the computing system could end up determining a range for that light pulse according to a time delay relative to an emission time of a different light pulse (e.g., a subsequently emitted light pulse), which would lead to an incorrect range determination.

On the other hand, if that same light pulse had a corresponding extended detection period and similarly reflected off the object positioned outside of the nominal detection range, that light pulse is likely to be detected during its corresponding extended detection period. In other words, the extended detection period effectively extends the detection range of the LIDAR device to be beyond (further and/or closer than) the nominal detection range. Further, if the LIDAR device detects that light pulse during its corresponding extended detection period, the computing system could determine a range for that light pulse according to a time delay relative to an emission time of the light pulse, which would amount to a correct range determination.

At block 608, method 600 involves making a further determination of whether or not the one or more ranges indicate that an object is positioned outside of the nominal detection range.

Given that a range determination for a light pulse detected during an extended detection period is more likely to be correct, the computing system could use light pulse(s) detected during extended detection period(s) to help determine whether or not an object might be positioned outside of the nominal detection range of the LIDAR device. In particular, once the computing system determines one or more ranges for light pulse(s) detected during extended detection period(s), the computing system may make a further determination of whether or not these one or more ranges indicate that an object is positioned outside of the nominal detection range, and the computing system could do so in various ways.

In one example implementation, the computing system could make the further determination through a comparison of these one or more ranges to the nominal detection range. In particular, the computing system may determine whether or not the nominal detection range comprises the one or more ranges. If the computing system determines that the nominal detection range comprises the one or more ranges, then the computing system may responsively determine that the one or more ranges do not indicate that an object is positioned outside of the nominal detection range. In this case, the computing system could further responsively determine that the one or more ranges indicate that an object is positioned within the nominal detection range. On the other hand, if the computing system determines that the nominal detection range does not comprise the one or more ranges, then the computing system may responsively determine that the one or more ranges indicate that an object is positioned outside of the nominal detection range.

By way of example, the LIDAR device may detect a light pulse during an extended detection period and the computing system may determine a range of 92 m for that light pulse according to a time delay relative to an emission time of that light pulse. The computing system may then compare that determined range to a nominal detection range spanning from 2 m to 60 m. In this example, the computing system may determine that the nominal detection range does not comprise the determined range. In particular, the range of 92 m is outside of the nominal detection range spanning from 2 m to 60 m. As such, the computing system may responsively determine that the determined range of 92 m indicates that an object is positioned outside of the nominal detection range.

In another example, the LIDAR device may detect a light pulse during an extended detection period and the computing system may determine a range of 18 m for that light pulse according to a time delay relative to an emission time of that light pulse. The computing system may then compare that determined range to the nominal detection range spanning from 2 m to 60 m. In this example, the computing system may determine that the nominal detection range comprises the determined range. In particular, the range of 18 m is within the nominal detection range spanning from 2 m to 60 m. As such, the computing system may responsively determine that the determined range of 18 m does not indicate that an object is positioned outside of the nominal detection range. In this case, the computing system could further responsively determine that the determined range of 18 m indicates that an object is positioned within the nominal detection range. Other examples are also possible.

In a further aspect, when the computing system determines that the one or more ranges indicate that an object is positioned outside of the nominal detection range, the computing system could more specifically determine whether that object might be positioned closer than the nominal detection range or whether that object might be positioned beyond the nominal detection range. The computing system could do so in various ways.

In one example implementation, the computing system may determine whether the one or more ranges are less than the minimum unambiguous detection range or whether the one or more ranges are greater than the maximum unambiguous detection range. If the computing system determines that the one or more ranges are less than the minimum unambiguous detection range, then the computing system may responsively determine that the one or more ranges indicate that an object is positioned closer than the nominal detection range. On the other hand, if the computing system determines that the one or more ranges are greater than the maximum unambiguous detection range, then the computing system may responsively determine that the one or more ranges indicate that an object is positioned beyond the nominal detection range. Other implementations are also possible.

At block 610, method 600 involves engaging in object detection in accordance with the further determination.

Once the computing system makes the further determination of whether or not the ranges indicate that an object is positioned outside of the nominal detection range, the computing system may then engage in object detection accordingly.

In an example implementation, engaging in object detection in accordance with the further determination could involve using the further determination as a basis for overcoming range ambiguity, such as for purposes of determining appropriate ranges to use for further object detection (e.g., identification of an object).

Generally, the computing system could determine that the LIDAR device detected other return light pulses, such as other than those detected during the above-mentioned extended detection period(s), and could then responsively generate multiple range hypotheses for these other return light pulses. However, in line with the discussion above, the computing system may encounter range ambiguity, as it may be unclear without additional information which of these range hypotheses is correct and which of these range hypotheses is incorrect.

In a specific example, the computing system could determine that the LIDAR device detected return light pulses during standard detection period(s) that are substantially close in time to the above-mentioned extended detection period(s) during which light pulse(s) were detected as discussed with regards to block 604. In practice, these could be one or more standard detection periods that immediately follow and/or immediately precede one of the extended detection periods, for instance. In this example, the computing system could in turn responsively determine that (i) the detected other return light pulses have detection times relative to corresponding emission times of a plurality of first emitted light pulses that are indicative of a first set of ranges and (ii) the detected other return light pulses have detection times relative to corresponding emission times of a plurality of second emitted light pulses that are indicative of a second set of ranges. However, range ambiguity may arise as it may be unclear as to whether the first or second set of ranges should be used as a basis for object detection.

In accordance with the present disclosure, the computing system could overcome such range ambiguity based on evaluation of light pulses detection(s) during extended detection period(s). In particular, once the computing system determines range(s) for light pulse(s) detected during extended detection period(s) and makes the further determination of whether or not these range(s) indicate that an object is positioned outside of the nominal detection range, the computing system could then use this further determination as a basis to select between using the first set of ranges and using the second set of range for object detection.

More specifically, if the further determination is that the range(s) do not indicate an object is positioned outside of the nominal detection range, this may further serve as an indication that the light pulses detected during the close-in-time standard detection period(s) are more likely to be light pulses that reflected off an object positioned within the nominal detection range, and thus may ultimately serve as an indication that a close range hypothesis is more likely to be correct. Whereas, if the further determination is that the range(s) indicate an object is positioned outside of the nominal detection range, this may further serve as an indication that the light pulses detected during the close-in-time standard detection period(s) are more likely to be light pulses that reflected off an object positioned outside of the nominal detection range, and thus may ultimately serve as an indication that an alternate range hypothesis is more likely to be correct.

By way of example, consider a scenario where the above-mentioned first set of ranges was determined according to a close range hypothesis and where the above-mentioned second set of ranges was determined according to an alternate range hypothesis. In this scenario, if the further determination is that the one or more ranges do not indicate an object positioned outside of the nominal detection range, then the computing system may responsively select and use the first set of ranges for object detection. On the other hand, if the further determination is that the one or more ranges indicate an object positioned outside of the nominal detection range, then the computing system may responsively select and use the second set of ranges for object detection. Once a range hypothesis is selected based on the further determination, the computing system may then engage in object detection in accordance with the selection.

In this manner, the disclosed implementation could help reduce the extent of computation often carried out to overcome range ambiguity and to determine whether or not an object is positioned outside of the nominal detection range. For instance, the disclosed implementation could allow a computing system to overcome range ambiguity without use of more computationally costly verification processes, such as evaluating resemblance of a range hypothesis to known object(s) and/or evaluating similarity of ranges in a range hypothesis.

In some implementations, however, the disclosed implementation could effectively serve as a guide for selectively triggering use of such more computationally costly processes. Such an approach could be advantageous because these processes could help overcome range ambiguity with even greater certainty. This in turn could also help reduce the overall extent of computation, as such processes would be used more selectively rather than be used on a more frequent basis.

When a computing system uses the disclosed implementation as a guide for selectively triggering use of other processes, these other processes could include evaluating resemblance of a range hypothesis to known object(s) and/or of evaluating similarity of ranges in a range hypothesis, as described in application Ser. No. 15/638,607, which is incorporated herein by reference. However, without departing from the scope of the present disclosure, it should be understood that the computing system could additionally or alternatively selectively engage in other types of processes to verify whether or not an object is positioned outside of the nominal detection range.

In any case, when a computing system uses the disclosed implementation as a guide for selectively triggering use of other processes, the computing system could do so in various ways.

For instance, the computing system may trigger use of one or more other verification processes only when light pulse detection(s) in extended detection period(s) indicate that an object might be positioned outside of the nominal detection range. In particular, if the above-mentioned further determination is that the one or more ranges do not indicate an object positioned outside of the nominal detection range, then the computing system could simply use the one or more ranges as basis for object detection as further discussed herein, thereby possibly avoiding use of other verification processes in such a situation. On the other hand, if the above-mentioned further determination is that the one or more ranges indicate an object positioned outside of the nominal detection range, then the computing system could responsively engage in an additional process to verify whether or not an object is indeed positioned outside of the nominal detection range.

Moreover, when the computing system engages in the additional verification process, the computing system may do so only for a direction where an object might be positioned outside of the nominal detection range. In particular, the LIDAR device may emit one or more particular light pulses in a particular direction of travel and may then detect these particular light pulses during extended detection period(s). Then, the computing system could determine range(s) for these particular light pulses, and may make a further determination that these range(s) indicate that an object is positioned outside of the nominal detection range and along the particular direction of travel. Therefore, in this scenario, the computing system may responsively engage in the additional verification process to verify whether or not an object is positioned outside of the nominal detection range and substantially along the particular direction of travel. To do so, for example, the computing system may generate and evaluate multiple range hypotheses in accordance with an additional verification process only for light pulses detected while the LIDAR device's detectors are oriented in the particular direction of travel. Other examples are also possible.

In a further aspect, engaging in object detection in accordance with the above-mentioned further determination could involve using the further determination as basis for generating a representation of an object, determining a distance to an object, and/or identifying an object, among other possibilities.

When the computing system generates a representation of an object in accordance with the further determination, this could involve assembling a point cloud representative of the object. However, other representations of an object are possible as well without departing from the scope of the present disclosure. In any case, once the computing system determines one or more ranges for light pulse(s) detected during extended detection period(s) and optionally makes the further determination of whether or not these ranges indicate an object positioned outside of the nominal detection range, the computing system could then use at least these ranges for generating a representation of the object.

Specifically, if the computing system determines that the one or more ranges indicate an object positioned outside of the nominal detection range, the computing system may responsively use at least these one or more ranges as a basis for generating a representation of the object positioned outside of the nominal detection range. In some cases, the computing system could additionally use one or more other ranges for generating the representation of the object positioned outside of the nominal detection range. Generally, these other ranges could be ranges determined for light pulse(s) detected during other detection periods, such as during standard detection periods that are substantially close in time to the extended detection period(s) during which light pulse(s) were detected as discussed with regards to block 604, for instance. Moreover, these other range(s) to be used for generating the representation could be range(s) selected in accordance with any one of the techniques discussed herein to overcome range ambiguity. For example, in line with the discussion above, these other range(s) could be part of an alternate range hypothesis selected based on evaluation of the light pulse(s) detected during the extended detection period(s).

On the other hand, if the computing system determines that the one or more ranges do not indicate that an object is positioned outside of the nominal detection range, the computing system may responsively use at least these one or more ranges as a basis for generating a representation of an object positioned within the nominal detection range. In some cases, the computing system could additionally use one or more other ranges for generating the representation of the object positioned within the nominal detection range. These other ranges could be ranges determined for other light pulse(s) detect during other detection periods. For example, in line with the discussion above, these other range(s) could be part of a close range hypothesis selected based on evaluation of the light pulse(s) detected during the extended detection period(s). Other examples are also possible.

Further, as noted, engaging in object detection in accordance with the further determination could involve using the further determination as a basis for determining a distance to an object.

In particular, if the further determination is that the one or more ranges indicate an object positioned outside of the nominal detection range, then the computing system may responsively use at least the one or more ranges as a basis for determining a distance between the LIDAR device and the object positioned outside of the nominal detection range. For instance, the computing system could determine this distance to be one of these ranges or to be an average of these ranges, among other options.

In some cases, the computing system could additionally use one or more other ranges for determining a distance to the object positioned outside of the nominal detection range. For instance, these other ranges could be ranges of an alternate range hypothesis (i) determined for light pulse(s) detected during standard detection periods and (ii) selected based on evaluation of the light pulse(s) detected during the extended detection period(s). As such, when determining a distance between the LIDAR device and the object positioned outside of the nominal detection range, the computing system could, for example, determine the distance to be an average of all the ranges at issue, which may include (i) the ranges determined for light pulses detected during extended detection periods and (ii) the ranges determined for light pulses detected during standard detection periods (e.g., according to a far range hypothesis). Other examples are also possible.

On the other hand, if the further determination is that the one or more ranges do not indicate that an object is positioned outside of the nominal detection range, then the computing system may responsively use at least the one or more ranges as a basis for determining a distance between the LIDAR device and an object positioned within the nominal detection range. For instance, the computing system could determine this distance to be one of these ranges or to be an average of these ranges, among other options.

In some cases, the computing system could additionally use one or more other ranges for determining a distance to the object positioned within the nominal detection range. For instance, these other ranges could be ranges of a close range hypothesis (i) determined for light pulse(s) detected during standard detection periods and (ii) selected based on evaluation of the light pulse(s) detected during the extended detection period(s). As such, when determining a distance between the LIDAR device and the object positioned within the nominal detection range, the computing system could, for example, determine the distance to be an average of all the ranges at issue, which may include (i) the ranges determined for light pulses detected during extended detection periods and (ii) the ranges determined for light pulses detected during standard detection periods. Other examples are also possible.

Yet further, as noted, engaging in object detection in accordance with the above-mentioned further determination could involve using the further determination as basis for identifying an object.

Generally, the computing system could identify an object by determining whether or not a set of ranges is representative of one or more known objects, such as based on object recognition technique(s). For instance, the computing system could have stored on or otherwise have access to a plurality of point clouds each respectively indicative of a known object (e.g., road sign(s)). Therefore, the computing system could assemble a point cloud based on a particular set of ranges, and could then determine whether or not this assembled point cloud matches at least one of the plurality of point clouds. If the assembled point cloud substantially matches at least one of the plurality of point clouds, then the computing system may determine that the particular set of ranges is representative of at least one known object. Otherwise, the computing system may determine that the particular set of ranges is not representative of at least one known object.

In any case, once the computing system determines one or more ranges for light pulse(s) detected during extended detection period(s) and makes the further determination of whether or not these ranges indicate an object positioned outside of the nominal detection range, the computing system could then use at least these ranges for identifying an object according to any feasible object identification technique.

Specifically, if the further determination is that the one or more ranges indicate an object positioned outside of the nominal detection range, then the computing system may responsively use at least these one or more ranges as a basis for identifying an object positioned outside of the nominal detection range. In some cases, the computing system could additionally use one or more other ranges for identifying the object positioned outside of the nominal detection range. For instance, these other ranges could be ranges of an alternate range hypothesis (i) determined for light pulse(s) detected during standard detection periods and (ii) selected based on evaluation of the light pulse(s) detected during the extended detection period(s).

On the other hand, if the further determination is that the one or more ranges do not indicate an object positioned outside of the nominal detection range, then the computing system may responsively use at least these one or more ranges as a basis for identifying an object positioned within the nominal detection range. In some cases, the computing system could additionally use one or more other ranges for identifying the object positioned within the nominal detection range. For instance, these other ranges could be ranges of a close range hypothesis (i) determined for light pulse(s) detected during standard detection periods and (ii) selected based on evaluation of the light pulse(s) detected during the extended detection period(s). Other cases are also possible.

In yet a further aspect, the implementations discussed herein could be alternatively described from the perspective of light pulse emission and time periods that respectively follow such light pulse emissions. Specifically, in line with the present disclosure, a computing system for a self-driving vehicle could operate a LIDAR device to emit light pulses at emission times in accordance with an emission time sequence. The emission time sequence may include a standard time period (e.g., associated with a nominal detection range for the LIDAR device) after a majority of emissions in the sequence and an extended time period after at least one of the emissions in the sequence. For example, the extended time period could occur after an emission emitted in a direction of travel of the vehicle. Other aspects are also possible.

FIGS. 7A-7D next illustrate example utilization of extended detection period(s) in a LIDAR system.

Figure 7A:
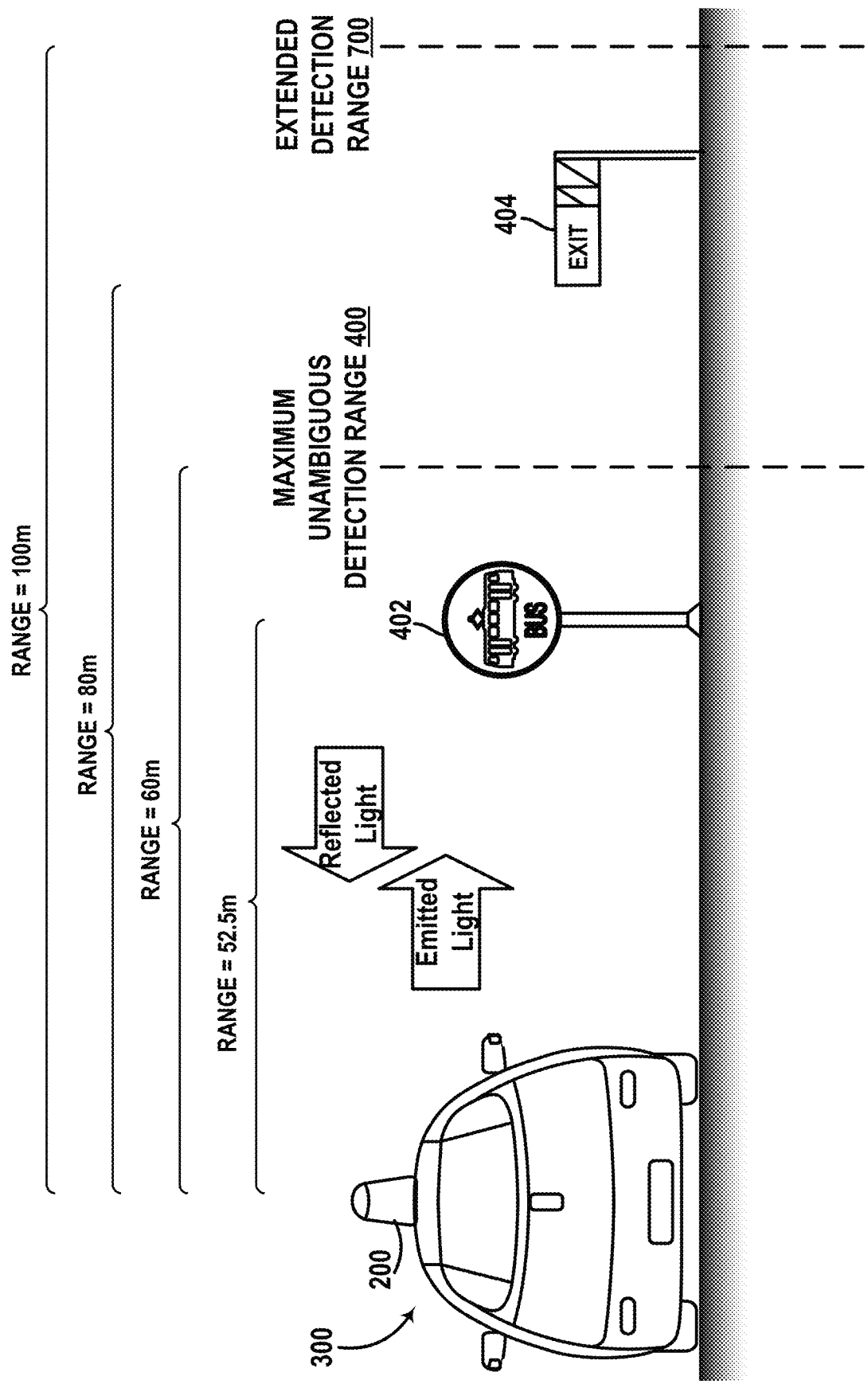
FIG. 7A illustrates an extended detection range, according to an example embodiment.
Figure 7B:
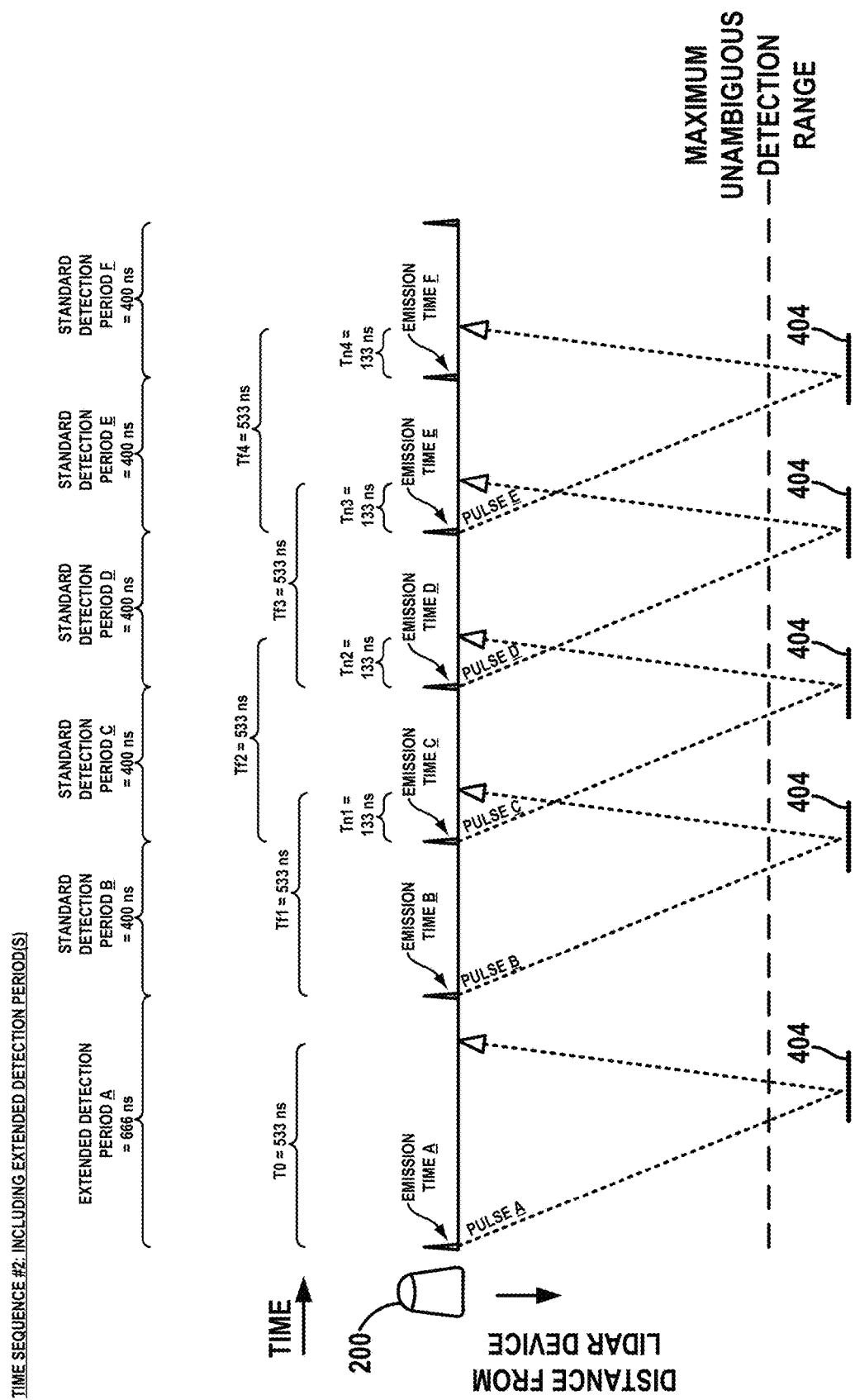
FIG. 7B illustrates a second time sequence that includes extended detection period(s), according to an example embodiment.

FIG. 7A shows that the LIDAR device 200 could have an extended detection range 700 of 100 m that is greater than the maximum unambiguous detection range 400 of 60 m. Generally, this extended detection range 700 could be sparsely provided by extended detection period(s), such as by the extended detection period A shown in FIG. 7B. In particular, FIG. 7B shows light pulses A-F emitted respectively at emission times A-F in accordance with a time sequence #2 that includes extended detection period(s). Specifically, these emission times establish an extended detection period A that is of a 666 ns duration as well as standard detection periods B-F each of the same 400 ns duration.

As shown, light pulse A as well as light pulses B-E each reflect off the distant object 404 positioned beyond the maximum unambiguous detection range 400 of the LIDAR device 200. However, due to light pulse A having a corresponding extended detection period A that provides for the extended range 700 greater than the maximum unambiguous detection range 400, light pulse A is detected during its corresponding extended detection period A.

Figure 7C:
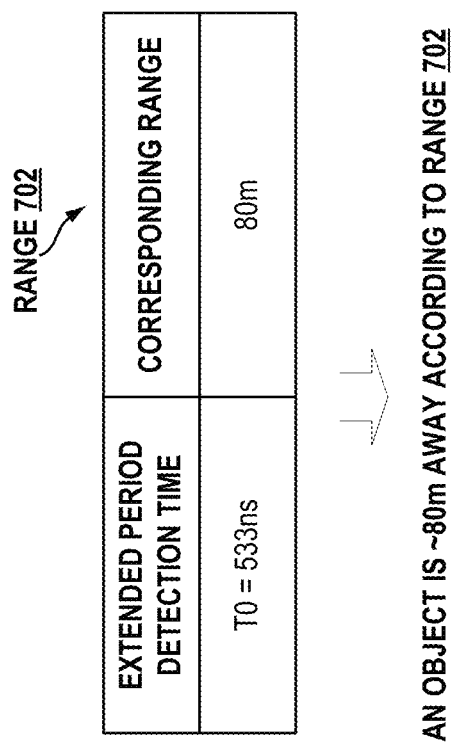
FIG. 7C illustrates use of an extended detection period for determining that an object is positioned outside of a nominal detection range of a LIDAR device, according to an example embodiment.

Given this, the computing system could correctly determine a range associated with detected light pulse A, even though the light pulse A reflected off the distant object 404 positioned beyond the maximum unambiguous detection range 400. Specifically, the computing system may determine that LIDAR device 200 detected light pulse A at a detection time T0 of 533 ns relative to emission time A, which corresponds to a range 702 of 80 m as shown in FIG. 7C. As shown in FIG. 7A, this range of 80 m is in fact the correct range at which the distant object 404 is positioned away from the LIDAR device 200. Thus, by determining a range for a light pulse A detected during the extended detection period A, the computing system could have a basis for determining whether or not an object might be positioned beyond the maximum unambiguous detection range 400, and could then engage in object detection accordingly.

By way of example, the computing system could determine that the maximum unambiguous detection range 400 of 60 m is less than the range 702 of 80 m, and the computing system could responsively determine that the range 702 indicates that an object is positioned beyond the maximum unambiguous detection range 400. Moreover, the computing system could use the range 702 to specifically determine that the distant object 404 is positioned at 80 m away from the LIDAR device 200. In turn, the computing system could then operate the vehicle 300 based at least on the determination that the distant object 404 is positioned at 80 m away from the LIDAR device 200, such by navigating the vehicle 300 according to the presence (and possibly identification) of the distant object 404 (e.g., a road sign), among other options.

Furthermore, as shown in FIG. 7B, light pulses B-E each reflect off the distant object 404 and, as a result, are each respectively detected during a subsequent standard detection period, and thus the computing system could generate multiple range hypotheses in line with the discussion above. In particular, the computing system could determine candidate ranges associated with detected light pulses B-E without accounting for the possibility of large retroreflective object(s) located beyond the maximum unambiguous detection range.

Figure 7D:
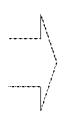
FIG. 7D illustrates use of an extended detection period for overcoming range ambiguity, according to an example embodiment.

For instance, the computing system may determine that the LIDAR device 200 detected light pulse B at a detection time Tn0 of 133 ns relative to emission time C, which corresponds to a range of 20 m as shown in FIG. 7D. And as indicated by detection times Tn1 to Tn4, a similar approach could be used for determining ranges associated with light pulses C-E, thereby resulting in first ranges 704 corresponding to a close range hypothesis of an object being positioned at 20 m away from the LIDAR device 200. Additionally, the computing system may determine that the LIDAR device 200 detected light pulse B at a detection time Tf1 of 533 ns relative to emission time B, which corresponds to a range of 80 m as shown in FIG. 7D. And as indicated by detection times Tf2 to Tf4, a similar approach could be used for determining ranges associated with light pulses C-E, thereby resulting in second ranges 706 corresponding to a far range hypothesis of an object being positioned at 80 m away from the LIDAR device 200.

In accordance with the present disclosure, the computing system could determine which of these range hypotheses is likely correct based on evaluation of the light pulse detection during an extended detection period. In particular, based on the determined range 702 for the light pulse A detected during extended detection period A and based on standard detection periods B-F being substantially close in time to the extended detection period A, the computing system could use the determined range 702 as basis for selecting between use of ranges 704 for object detection and use of ranges 706 for object detection. In doing so, as illustrated by FIG. 7D, the computing system could make a determination that range 702 indicates an object is positioned beyond the maximum unambiguous detection range 400, and could responsively select use of ranges 706 rather than ranges 704, as ranges 706 are greater than the maximum unambiguous detection range 400 and ranges 704 are less than the maximum unambiguous detection range 400.

Once the computing system selects use of ranges 706 for purposes object detection, the computing system could then engage in further object detection accordingly. For example, the computing system could assemble a point cloud based on a combination of range 702 and selected ranges 706. Moreover, the computing system could then use the assembled point cloud as a basis for identifying an object. Other examples and illustrations are also possible.

VI. CONTROLLING A VEHICLE BASED ON SCANS BY THE LIDAR DEVICE

As noted, a computing system may operate a vehicle based on scans received from the LIDAR device disclosed herein. In particular, the computing system may receive from the LIDAR device scans of an environment around the vehicle. And the computing system may operate the vehicle based at least on the scans of the environment received from the LIDAR device.

More specifically, the computing system may operate the LIDAR device 100 to emit light into the environment. Also, the computing system may receive from the LIDAR device 100 data representative of detections of reflected light. And by comparing detected light beams with emitted light beams, the computing system may determine at least one aspect of one or more objects in the environment.

For example, by comparing a time when a plurality of light beams were emitted by the transmitter of the LIDAR device 100 and a time when the receiver of the LIDAR device 100 detected reflected light, a distance between the LIDAR device 100 and an object in the environment may be determined. In other examples, aspects such as shape, color, material, etc. may also be determined based on various comparisons between emitted light and detected light.

With this arrangement, the computing system could determine a three-dimensional (3D) representation of the environment based on data from the LIDAR device 100. For example, the 3D representation may be generated by the computing system as a 3D point cloud based on the data from the LIDAR device 100. Each point of the 3D cloud, for example, may be associated with a reflected light pulse. As such, the computing system may (e.g., continuously or from time-to-time) generate 3D representations of the environment or portions thereof. And the computing system could then control operation of the vehicle based on evaluation of such 3D representations of the environment.

By way of example, the vehicle may be operated in an autonomous mode. In this example, the computing system may utilize 3D representations to navigate the vehicle (e.g., adjust speed, direction, etc.) safely by avoiding obstacles among other possibilities. The obstacles or objects, for example, may be detected and/or identified using an image processing algorithm or other computing method to analyze the 3D representations and detect and/or identify the various obstacles or objects. As another example, the vehicle may be operated in a partially autonomous or manual mode. In this example, the vehicle may notify a driver or operator of the vehicle of the presence or distance to various objects or changing road conditions (e.g., street lights, street signs, etc.), such as by causing a display or a speaker in the vehicle to present information regarding one or more objects in the environment. Other examples are possible as well.

Figure 8:
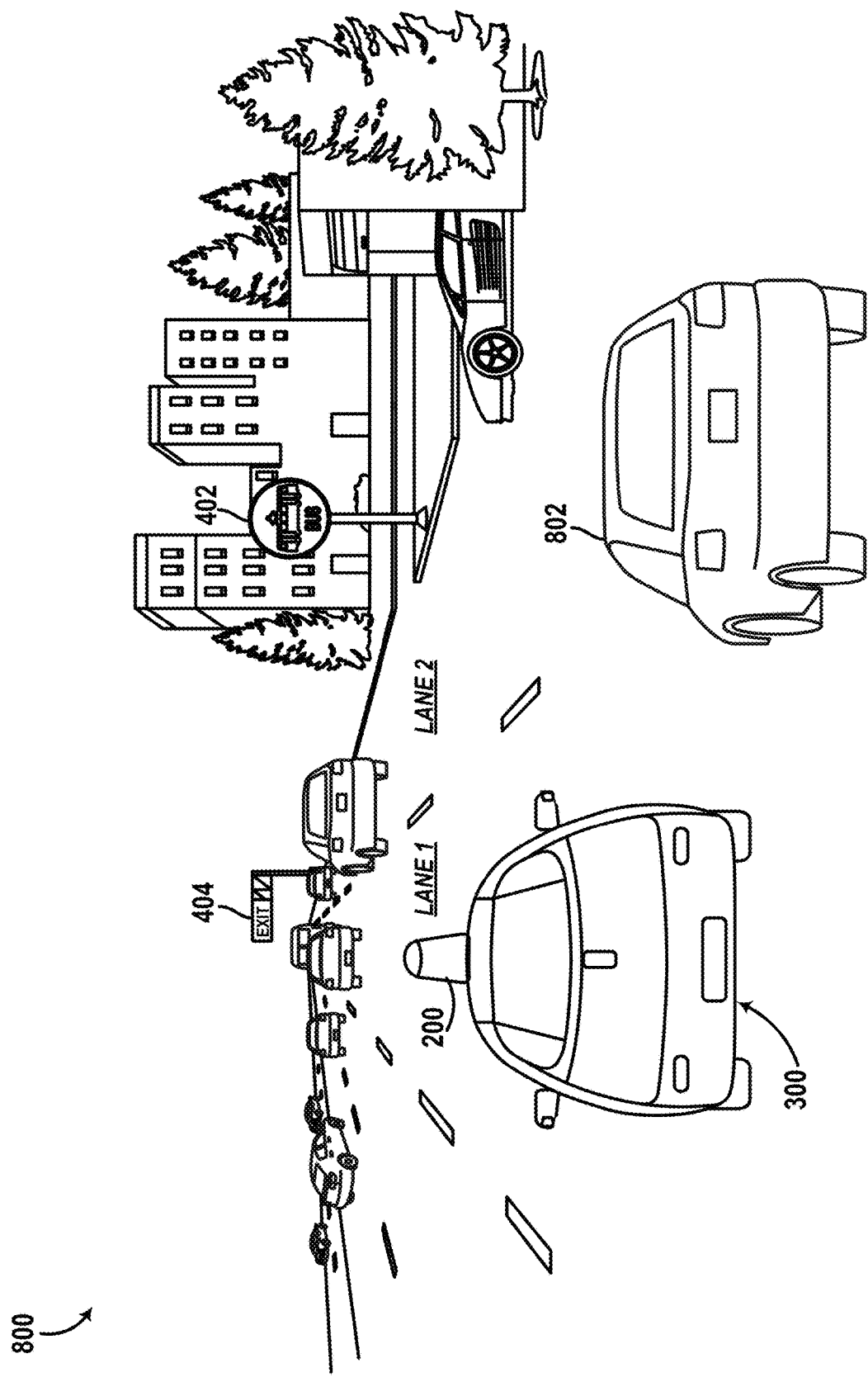
FIG. 8 illustrates operation of a vehicle based on scans of an environment received from a LIDAR device, according to an example embodiment.

FIG. 8 next illustrates example operation of the vehicle 300 based on scans of an environment 800 received from the LIDAR device 200. In accordance with the present disclosure, the vehicle's computing system may use data received from the LIDAR device 200 to detect and identify distant object(s), such as a road sign 404 for example. In this regard, the computing system may determine based on the data that the road sign 404 is representative of an exit that the vehicle 300 should ideally take in order to arrive at a desired destination. In response to making that determination, the computing system may then operate the vehicle 300 to switch from driving on lane 1 to driving on lane 2.

In practice, the computing system may distinguish between these lanes by recognizing lane markers within 3D representations of the environment 800. For instance, the vehicle's computing system may use data received from the LIDAR device 200 to detect and identify the nearby lane marker that separates lane 1 from lane 2. Moreover, before operating the vehicle to switch lanes, the computing system may scan the environment to detect and identify objects, so that computing system can operate the vehicle 300 in a way that avoids those detected/identified objects while also operating the vehicle 300 to switch lanes.

For instance, the computing system may use data received from the LIDAR device 200 to detect and identify the nearby vehicle 802 as well as to detect and identify road sign 402. Based on those detections/identifications, the computing system may operate the vehicle 300 in a way that avoids the vehicle 802 and road sign 402 while also operating the vehicle 300 to switch from driving on lane 1 to driving on lane 2. Other illustrations are possible as well.

VII. EXAMPLE ARRANGEMENT OF A VEHICLE

Figure 9:
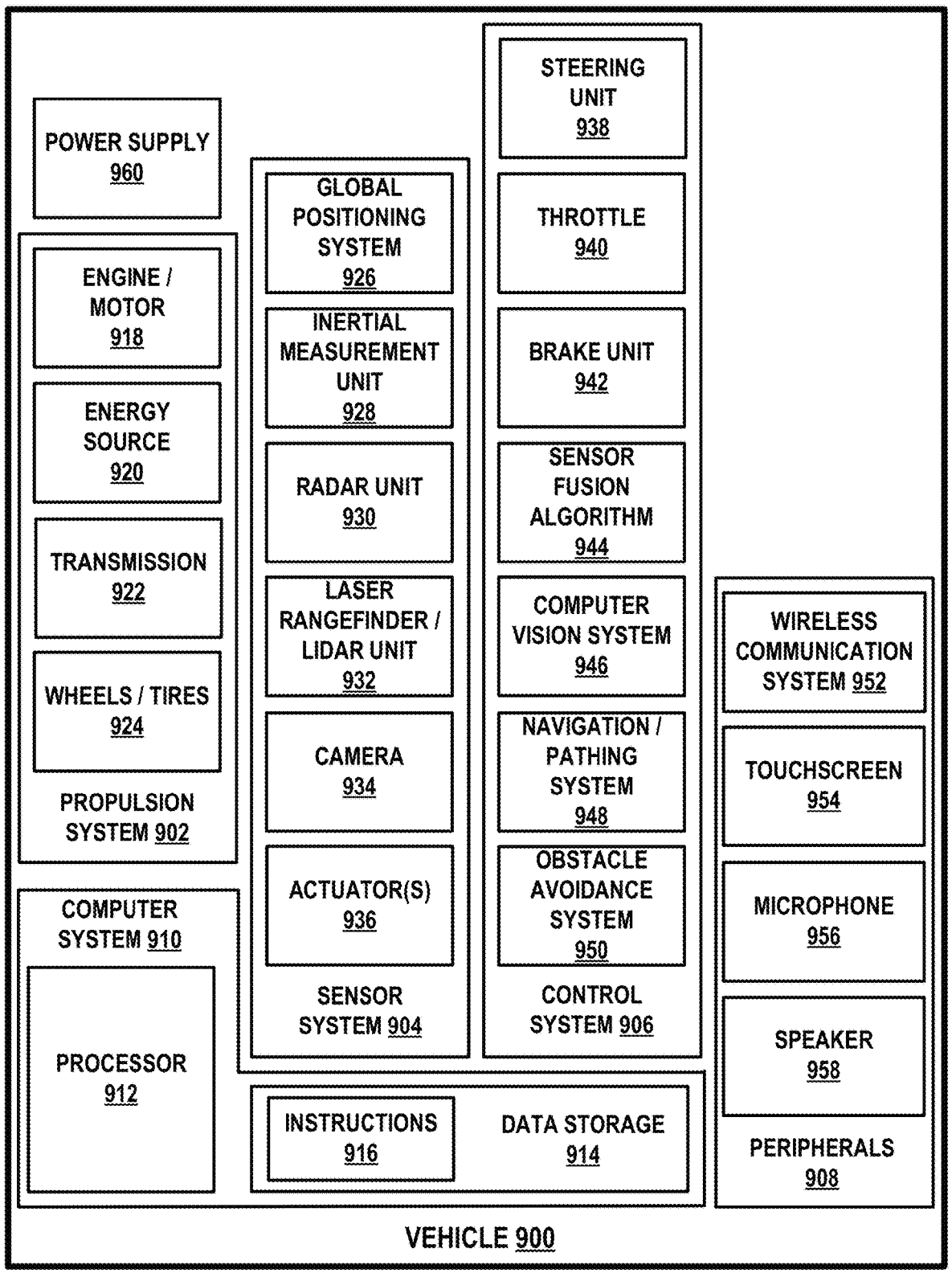
FIG. 9 is a simplified block diagram of a vehicle, according to an example embodiment.

Finally, FIG. 9 is a simplified block diagram of a vehicle 900, according to an example embodiment. The vehicle 900 may be similar to the vehicle 300, and may include a LIDAR device similar to the LIDAR device 100. Further, the vehicle 900 may be configured to perform functions and methods herein such as method 800 and/or method 1000. As shown, the vehicle 900 includes a propulsion system 902, a sensor system 904, a control system 906 (could also be referred to as a controller 906), peripherals 908, and a computer system 910. Vehicle 900 may be, for example, a motor vehicle, railed vehicle, watercraft, or aircraft. In other embodiments, the vehicle 900 may include more, fewer, or different systems, and each system may include more, fewer, or different components.

Additionally, the systems and components shown may be combined or divided in any number of ways. For instance, the control system 906 and the computer system 910 may be combined into a single system that operates the vehicle 900 in accordance with various operations.

The propulsion system 902 may be configured to provide powered motion for the vehicle 900. As shown, the propulsion system 902 includes an engine/motor 918, an energy source 920, a transmission 922, and wheels/tires 924.

The engine/motor 918 may be or include any combination of an internal combustion engine, an electric motor, a steam engine, and a Stirling engine. Other motors and engines are possible as well. In some embodiments, the propulsion system 902 may include multiple types of engines and/or motors. For instance, a gas-electric hybrid car may include a gasoline engine and an electric motor. Other examples are possible.

The energy source 920 may be a source of energy that powers the engine/motor 918 in full or in part. That is, the engine/motor 918 may be configured to convert the energy source 920 into mechanical energy. Examples of energy sources 920 include gasoline, diesel, propane, other compressed gas-based fuels, ethanol, solar panels, batteries, and other sources of electrical power. The energy source(s) 920 may additionally or alternatively include any combination of fuel tanks, batteries, capacitors, and/or flywheels. In some embodiments, the energy source 920 may provide energy for other systems of the vehicle 900 as well.

The transmission 922 may be configured to transmit mechanical power from the engine/motor 918 to the wheels/tires 924. To this end, the transmission 922 may include a gearbox, clutch, differential, drive shafts, and/or other elements. In embodiments where the transmission 922 includes drive shafts, the drive shafts may include one or more axles that are configured to be coupled to the wheels/tires 924.

The wheels/tires 924 of vehicle 900 may be configured in various formats, including a bicycle/motorcycle, tricycle, car/truck four-wheel format, or a rail. Other wheel/tire formats are possible as well, such as those including six or more wheels. In any case, the wheels/tires 924 may be configured to rotate differentially with respect to other wheels/tires 924. In some embodiments, the wheels/tires 924 may include at least one wheel that is fixedly attached to the transmission 922 and at least one tire coupled to a rim of the wheel that could make contact with the driving surface. The wheels/tires 924 may include any combination of metal and rubber, or combination of other materials. The propulsion system 902 may additionally or alternatively include components other than those shown.

The sensor system 904 may include a number of sensors configured to sense information about an environment in which the vehicle 900 is located, as well as one or more actuators 936 configured to modify a position and/or orientation of the sensors. As shown, the sensors of the sensor system 904 include a Global Positioning System (GPS) 926, an inertial measurement unit (IMU) 928, a RADAR unit 930, a laser rangefinder and/or LIDAR unit 932, and a camera 934. The sensor system 904 may include additional sensors as well, including, for example, sensors that monitor internal systems of the vehicle 900 (e.g., an 02 monitor, a fuel gauge, an engine oil temperature, etc.). Other sensors are possible as well.

The GPS 926 may be any sensor (e.g., location sensor) configured to estimate a geographic location of the vehicle 900. To this end, the GPS 926 may include a transceiver configured to estimate a position of the vehicle 900 with respect to the Earth. The GPS 926 may take other forms as well.

The IMU 928 may be any combination of sensors configured to sense position and orientation changes of the vehicle 900 based on inertial acceleration. In some embodiments, the combination of sensors may include, for example, accelerometers and gyroscopes. Other combinations of sensors are possible as well.

The RADAR unit 930 may be any sensor configured to sense objects in the environment in which the vehicle 900 is located using radio signals. In some embodiments, in addition to sensing the objects, the RADAR unit 930 may additionally be configured to sense the speed and/or heading of the objects.

Similarly, the laser range finder or LIDAR unit 932 may be any sensor configured to sense objects in the environment in which the vehicle 900 is located using lasers. For example, LIDAR unit 932 may include one or more LIDAR devices, at least some of which may take the form the LIDAR device 100 disclosed herein.

The camera 934 may be any camera (e.g., a still camera, a video camera, etc.) configured to capture images of the environment in which the vehicle 900 is located. To this end, the camera may take any of the forms described above. The sensor system 904 may additionally or alternatively include components other than those shown.

The control system 906 may be configured to control operation of the vehicle 900 and its components. To this end, the control system 906 may include a steering unit 938, a throttle 940, a brake unit 942, a sensor fusion algorithm 944, a computer vision system 946, a navigation or pathing system 948, and an obstacle avoidance system 950.

The steering unit 938 may be any combination of mechanisms configured to adjust the heading of vehicle 900. The throttle 940 may be any combination of mechanisms configured to control the operating speed of the engine/motor 918 and, in turn, the speed of the vehicle 900. The brake unit 942 may be any combination of mechanisms configured to decelerate the vehicle 900. For example, the brake unit 942 may use friction to slow the wheels/tires 924. As another example, the brake unit 942 may convert the kinetic energy of the wheels/tires 924 to electric current. The brake unit 942 may take other forms as well.

The sensor fusion algorithm 944 may be an algorithm (or a computer program product storing an algorithm) configured to accept data from the sensor system 904 as an input. The data may include, for example, data representing information sensed at the sensors of the sensor system 904. The sensor fusion algorithm 944 may include, for example, a Kalman filter, a Bayesian network, an algorithm for some of the functions of the methods herein, or any other algorithm. The sensor fusion algorithm 944 may further be configured to provide various assessments based on the data from the sensor system 904, including, for example, evaluations of individual objects and/or features in the environment in which the vehicle 900 is located, evaluations of particular situations, and/or evaluations of possible impacts based on particular situations. Other assessments are possible as well.

The computer vision system 946 may be any system configured to process and analyze images captured by the camera 934 in order to identify objects and/or features in the environment in which the vehicle 900 is located, including, for example, traffic signals and obstacles. To this end, the computer vision system 946 may use an object recognition algorithm, a Structure from Motion (SFM) algorithm, video tracking, or other computer vision techniques. In some embodiments, the computer vision system 946 may additionally be configured to map the environment, track objects, estimate the speed of objects, etc.

The navigation and pathing system 948 may be any system configured to determine a driving path for the vehicle 900. The navigation and pathing system 948 may additionally be configured to update the driving path dynamically while the vehicle 900 is in operation. In some embodiments, the navigation and pathing system 948 may be configured to incorporate data from the sensor fusion algorithm 944, the GPS 926, the LIDAR unit 932, and one or more predetermined maps so as to determine the driving path for vehicle 900.

The obstacle avoidance system 950 may be any system configured to identify, evaluate, and avoid or otherwise negotiate obstacles in the environment in which the vehicle 900 is located. The control system 906 may additionally or alternatively include components other than those shown.

Peripherals 908 may be configured to allow the vehicle 900 to interact with external sensors, other vehicles, external computing devices, and/or a user. To this end, the peripherals 908 may include, for example, a wireless communication system 952, a touchscreen 954, a microphone 956, and/or a speaker 958.

The wireless communication system 952 may be any system configured to wirelessly couple to one or more other vehicles, sensors, or other entities, either directly or via a communication network. To this end, the wireless communication system 952 may include an antenna and a chipset for communicating with the other vehicles, sensors, servers, or other entities either directly or via a communication network. The chipset or wireless communication system 952 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 952 may take other forms as well.

The touchscreen 954 may be used by a user to input commands to the vehicle 900. To this end, the touchscreen 954 may be configured to sense at least one of a position and a movement of a user's finger via capacitive sensing, resistance sensing, or a surface acoustic wave process, among other possibilities. The touchscreen 954 may be capable of sensing finger movement in a direction parallel or planar to the touchscreen surface, in a direction normal to the touchscreen surface, or both, and may also be capable of sensing a level of pressure applied to the touchscreen surface. The touchscreen 954 may be formed of one or more translucent or transparent insulating layers and one or more translucent or transparent conducting layers. The touchscreen 954 may take other forms as well.

The microphone 956 may be configured to receive audio (e.g., a voice command or other audio input) from a user of the vehicle 900. Similarly, the speakers 958 may be configured to output audio to the user of the vehicle 900. The peripherals 908 may additionally or alternatively include components other than those shown.

The computer system 910 may be configured to transmit data to, receive data from, interact with, and/or control one or more of the propulsion system 902, the sensor system 904, the control system 906, and the peripherals 908. To this end, the computer system 910 may be communicatively linked to one or more of the propulsion system 902, the sensor system 904, the control system 906, and the peripherals 908 by a system bus, network, and/or other connection mechanism (not shown).

In one example, the computer system 910 may be configured to control operation of the transmission 922 to improve fuel efficiency. As another example, the computer system 910 may be configured to cause the camera 934 to capture images of the environment. As yet another example, the computer system 910 may be configured to store and execute instructions corresponding to the sensor fusion algorithm 944. As still another example, the computer system 910 may be configured to store and execute instructions for determining a 3D representation of the environment around the vehicle 900 using the LIDAR unit 932. Other examples are possible as well. Thus, the computer system 910 could function as the controller for the LIDAR unit 932.

As shown, the computer system 910 includes the processor 912 and data storage 914. The processor 912 may include one or more general-purpose processors and/or one or more special-purpose processors. To the extent the processor 912 includes more than one processor, such processors could work separately or in combination. Data storage 914, in turn, may include one or more volatile and/or one or more non-volatile storage components, such as optical, magnetic, and/or organic storage, and data storage 914 may be integrated in whole or in part with the processor 912.

In some embodiments, data storage 914 may contain instructions 916 (e.g., program logic) executable by the processor 912 to execute various vehicle functions (e.g., method 500, etc.). Data storage 914 may contain additional instructions as well, including instructions to transmit data to, receive data from, interact with, and/or control one or more of the propulsion system 902, the sensor system 904, the control system 906, and/or the peripherals 908. The computer system 910 may additionally or alternatively include components other than those shown.

As shown, the vehicle 900 further includes a power supply 960, which may be configured to provide power to some or all of the components of the vehicle 900. To this end, the power supply 960 may include, for example, a rechargeable lithium-ion or lead-acid battery. In some embodiments, one or more banks of batteries could be configured to provide electrical power. Other power supply materials and configurations are possible as well. In some embodiments, the power supply 960 and energy source 920 may be implemented together as one component, as in some all-electric cars.

In some embodiments, the vehicle 900 may include one or more elements in addition to or instead of those shown. For example, the vehicle 900 may include one or more additional interfaces and/or power supplies. Other additional components are possible as well. In such embodiments, data storage 914 may further include instructions executable by the processor 912 to control and/or communicate with the additional components.

Still further, while each of the components and systems are shown to be integrated in the vehicle 900, in some embodiments, one or more components or systems may be removably mounted on or otherwise connected (mechanically or electrically) to the vehicle 900 using wired or wireless connections. The vehicle 900 may take other forms as well.

VIII. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I claim:

1. A method comprising:
   operating, by a computing system, a Light Detection and Ranging (LIDAR) device to emit a plurality of light pulses and to detect return light pulses in a plurality of corresponding detection periods, wherein the plurality of corresponding detection periods includes (i) one or more standard detection periods that establish a nominal detection range for the LIDAR device and (ii) one or more extended detection periods having respective durations that are longer than respective durations of the one or more standard detection periods;
   receiving, by the computing system, information indicative of a first return light pulse from an object detected by the LIDAR device during a particular extended detection period of the one or more extended detection periods, wherein the information indicative of the first return light pulse comprises a first detection time associated with the first return light pulse;
   receiving, by the computing system, information indicative of a second return light pulse from the object detected by the LIDAR device during a particular standard detection period of the one or more standard detection periods, wherein the information indicative of the second return light pulse comprises a second detection time associated with the second return light pulse; and
   determining, by the computing system, a distance to the object based on the first detection time and the second detection time.

2. The method of claim 1, wherein the particular extended detection period is earlier in time than the particular standard detection period.

3. The method of claim 1, wherein the particular extended detection period is later in time than the particular standard detection period.

4. The method of claim 1, wherein determining, by the computing system, the distance to the object based on the first detection time and the second detection time comprises:
   determining that the object is positioned within the nominal detection range based on a first time difference between the first detection time and a first emission time of a light pulse corresponding to the particular extended detection period being indicative of a distance that is less than the nominal detection range; and
   based on the object being positioned within the nominal detection range, determining the distance to the object based on a second time difference between the second detection time and a second emission time of a light pulse corresponding to the particular standard detection period.

5. The method of claim 1, wherein determining, by the computing system, the distance to the object based on the first detection time and the second detection time comprises:
   determining that the object is positioned outside of the nominal detection range based on a first time difference between the first detection time and a first emission time of a light pulse corresponding to the particular extended detection period being indicative of a distance that is greater than the nominal detection range; and
   based on the object being positioned outside of the nominal detection range, determining the distance to the object based on a third time difference between the second detection time and a third emission time of a light pulse corresponding to a preceding standard detection period of the one or more standard detection periods, wherein the preceding standard detection period is earlier in time than the particular standard detection period.

6. The method of claim 1, further comprising:
   receiving, by the computing system, information indicative of one or more additional return light pulses from the object detected by the LIDAR device during one or more additional standard detection periods of the one or more standard detection periods, wherein the information indicative of the one or more additional return light pulses comprises one or more additional detection times associated with the one or more additional return light pulses; and determining, by the computing system, one or more additional distances to the object based on the first detection time and the one or more additional detection times.

7. The method of claim 6, further comprising:
generating, by the computing system, a point cloud representation of the object based on the distance to the object and the one or more additional distances to the object.

8. The method of claim 1, further comprising:
determining, by the computing system, a schedule specifying when the one or more standard detection periods occur and when the one or more extended detection periods occur.

9. The method of claim 8, wherein the LIDAR device is coupled to a vehicle, and wherein determining, by the computing system, the schedule specifying when the one or more standard detection periods occur and when the one or more extended detection periods occur comprises determining the schedule based on information about an environment of the vehicle.

10. A computing system comprising:
one or more processors;
a non-transitory computer readable medium; and
program instructions stored on the non-transitory computer readable medium and executable by the one or more processors to perform operations comprising:
  operating a Light Detection and Ranging (LIDAR) device to emit a plurality of light pulses and to detect return light pulses in a plurality of corresponding detection periods, wherein the plurality of corresponding detection periods includes (i) one or more standard detection periods that establish a nominal detection range for the LIDAR device and (ii) one or more extended detection periods having respective durations that are longer than respective durations of the one or more standard detection periods;
  receiving information indicative of a first return light pulse from an object detected by the LIDAR device during a particular extended detection period of the one or more extended detection periods, wherein the information indicative of the first return light pulse comprises a first detection time associated with the first return light pulse;
  receiving information indicative of a second return light pulse from the object detected by the LIDAR device during a particular standard detection period of the one or more standard detection periods, wherein the information indicative of the second return light pulse comprises a second detection time associated with the second return light pulse; and
  determining a distance to the object based on the first detection time and the second detection time.

11. The computing system of claim 10, wherein the particular extended detection period is earlier in time than the particular standard detection period.

12. The computing system of claim 10, wherein the particular extended detection period is later in time than the particular standard detection period.

13. The computing system of claim 10, wherein determining the distance to the object based on the first detection time and the second detection time comprises:
determining that the object is positioned within the nominal detection range based on a first time difference between the first detection time and a first emission time of a light pulse corresponding to the particular extended detection period being indicative of a distance that is less than the nominal detection range; and
based on the object being positioned within the nominal detection range, determining the distance to the object based on a second time difference between the second detection time and a second emission time of a light pulse corresponding to the particular standard detection period.

14. The computing system of claim 10, wherein determining the distance to the object based on the first detection time and the second detection time comprises:
determining that the object is positioned outside of the nominal detection range based on a first time difference between the first detection time and a first emission time of a light pulse corresponding to the particular extended detection period being indicative of a distance that is greater than the nominal detection range; and
based on the object being positioned outside of the nominal detection range, determining the distance to the object based on a third time difference between the second detection time and a third emission time of a light pulse corresponding to a preceding standard detection period of the one or more standard detection periods, wherein the preceding standard detection period is earlier in time than the particular standard detection period.

15. The computing system of claim 10, wherein the operations further comprise:
receiving information indicative of one or more additional return light pulses from the object detected by the LIDAR device during one or more additional standard detection periods of the one or more standard detection periods, wherein the information indicative of the one or more additional return light pulses comprises one or more additional detection times associated with the one or more additional return light pulses; and
determining one or more additional distances to the object based on the first detection time and the one or more additional detection times.

16. The computing system of claim 15, wherein the operations further comprise:
generating a point cloud representation of the object based on the distance to the object and the one or more additional distances to the object.

17. A vehicle comprising:
a Light Detection and Ranging (LIDAR) device; and
a computing system configured to perform operations comprising:
  operating the LIDAR device to emit a plurality of light pulses and to detect return light pulses in a plurality of corresponding detection periods, wherein the plurality of corresponding detection periods includes (i) one or more standard detection periods that establish a nominal detection range for the LIDAR device and (ii) one or more extended detection periods having respective durations that are longer than respective durations of the one or more standard detection periods;
  receiving information indicative of a first return light pulse from an object detected by the LIDAR device during a particular extended detection period of the one or more extended detection periods, wherein the information indicative of the first return light pulse comprises a first detection time associated with the first return light pulse;

receiving information indicative of a second return light pulse from the object detected by the LIDAR device during a particular standard detection period of the one or more standard detection periods, wherein the information indicative of the second return light pulse comprises a second detection time associated with the second return light pulse; and determining a distance to the object based on the first detection time and the second detection time.

18. The vehicle of claim 17, wherein determining the distance to the object based on the first detection time and the second detection time comprises:

determining that the object is positioned within the nominal detection range based on a first time difference between the first detection time and a first emission time of a light pulse corresponding to the particular extended detection period being indicative of a distance that is less than the nominal detection range; and based on the object being positioned within the nominal detection range, determining the distance to the object based on a second time difference between the second detection time and a second emission time of a light pulse corresponding to the particular standard detection period.

19. The vehicle of claim 17, wherein determining the distance to the object based on the first detection time and the second detection time comprises:

determining that the object is positioned outside of the nominal detection range based on a first time difference between the first detection time and a first emission time of a light pulse corresponding to the particular extended detection period being indicative of a distance that is greater than the nominal detection range; and based on the object being positioned outside of the nominal detection range, determining the distance to the object based on a third time difference between the second detection time and a third emission time of a light pulse corresponding to a preceding standard detection period of the one or more standard detection periods, wherein the preceding standard detection period is earlier in time than the particular standard detection period.

20. The vehicle of claim 17, wherein the operations further comprise:

determining, based on information about an environment of the vehicle, a schedule specifying when the one or more standard detection periods occur and when the one or more extended detection periods occur.

* * * * *